United States Patent
Sakai et al.

(10) Patent No.: US 10,054,818 B2
(45) Date of Patent: Aug. 21, 2018

(54) MIRROR PLATE AND MIRROR DISPLAY

(71) Applicant: Sharp Kabushiki Kaisha, Sakai, Osaka (JP)

(72) Inventors: Akira Sakai, Sakai (JP); Masahiro Hasegawa, Sakai (JP); Hiroyuki Hakoi, Sakai (JP); Kiyoshi Minoura, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/323,143

(22) PCT Filed: Jul. 1, 2015

(86) PCT No.: PCT/JP2015/068940
§ 371 (c)(1),
(2) Date: Dec. 30, 2016

(87) PCT Pub. No.: WO2016/006507
PCT Pub. Date: Jan. 14, 2016

(65) Prior Publication Data
US 2017/0168349 A1    Jun. 15, 2017

(30) Foreign Application Priority Data
Jul. 8, 2014    (JP) ................... 2014-140658

(51) Int. Cl.
*G02B 5/08*    (2006.01)
*G02B 7/182*   (2006.01)
(Continued)

(52) U.S. Cl.
CPC ......... *G02F 1/133553* (2013.01); *G02B 1/14* (2015.01); *G02B 5/0808* (2013.01); *G02B 5/3033* (2013.01); *G02F 1/133536* (2013.01)

(58) Field of Classification Search
CPC .......... G02B 5/0808; G02B 1/14; G02B 5/08; G02B 1/105; G02B 5/3033;
(Continued)

(56) References Cited

U.S. PATENT DOCUMENTS 5,828,488 A    10/1998   Ouderkirk et al.
6,271,901 B1    8/2001   Ide et al.
(Continued)

FOREIGN PATENT DOCUMENTS

JP    11-015392 A    1/1999
JP    2001-242450 A    9/2001
(Continued)

OTHER PUBLICATIONS

Official Communication issued in International Patent Application No. PCT/JP2015/068940, dated Sep. 15, 2015.

*Primary Examiner* — Jade R Chwasz
(74) *Attorney, Agent, or Firm* — Keating & Bennett, LLP

(57) ABSTRACT

The present invention provides a mirror plate capable of suppressing the occurrence of orange peel-like unevenness. The mirror plate includes a mirror film including a mirror layer and an adhesive layer; and a substrate. The adhesive layer is attached to one surface of the substrate. The one surface of the substrate has an arithmetic average roughness of less than 0.03 μm. The mirror film includes no hard coat layer containing cured resin. The thicknesses of the mirror layer and the adhesive layer have a relation satisfying: $tA/tM \leq 0.18$, where tM represents the thickness of the mirror layer and tA represents the thickness of the adhesive layer.

12 Claims, 1 Drawing Sheet

(51) Int. Cl.
*G02F 1/1335* (2006.01)
*G02B 1/14* (2015.01)
*G02B 5/30* (2006.01)

(58) Field of Classification Search
CPC ......... G02F 1/133553; G02F 1/133528; G02F 1/133533; G02F 1/133536
USPC ................................ 359/838, 839, 883, 884
See application file for complete search history.

(56) References Cited

U.S. PATENT DOCUMENTS

| | | |
|---|---|---|
| 6,804,058 B1 | 10/2004 | Ouderkirk et al. |
| 2004/0051827 A1 | 3/2004 | Hinata et al. |
| 2005/0008879 A1* | 1/2005 | Shin ..................... C23C 14/024 428/446 |
| 2005/0024726 A1 | 2/2005 | Ouderkirk et al. |
| 2007/0091230 A1 | 4/2007 | Ouderkirk et al. |
| 2007/0121034 A1 | 5/2007 | Ouderkirk et al. |
| 2009/0079909 A1 | 3/2009 | Ouderkirk et al. |
| 2009/0223704 A1 | 9/2009 | Osada et al. |
| 2012/0097427 A1 | 4/2012 | Sada et al. |
| 2013/0160938 A1 | 6/2013 | Yasui et al. |
| 2013/0216805 A1 | 8/2013 | Yasui et al. |
| 2014/0130955 A1 | 5/2014 | Yasui et al. |
| 2015/0109696 A1 | 4/2015 | Sashi et al. |

FOREIGN PATENT DOCUMENTS

| | | |
|---|---|---|
| JP | 2002-365432 A | 12/2002 |
| JP | 2003-241175 A | 8/2003 |
| JP | 2004-085590 A | 3/2004 |
| JP | 2004-125885 A | 4/2004 |
| JP | 2005-345958 A | 12/2005 |
| JP | 2005-345990 A | 12/2005 |
| JP | 2005345958 A * | 12/2005 |
| JP | 2008-052294 A | 3/2008 |
| JP | 2008-151998 A | 7/2008 |
| JP | 2009-157352 A | 7/2009 |
| JP | 2010-020211 A | 1/2010 |
| JP | 2010-231016 A | 10/2010 |
| JP | 2011-094150 A | 5/2011 |
| JP | 2012-133308 A | 7/2012 |
| WO | 95/17692 A1 | 6/1995 |
| WO | 2007/020861 A1 | 2/2007 |
| WO | 2013/153923 A1 | 10/2013 |
| WO | 2014/002130 A1 | 1/2014 |

* cited by examiner

MIRROR PLATE AND MIRROR DISPLAY

TECHNICAL FIELD

The present invention relates to a mirror plate and a mirror display. The present invention specifically relates to a mirror plate that functions as a mirror, and a mirror display including the mirror plate.

BACKGROUND ART

Recently, mirror displays have been proposed for applications such as digital signage (e.g. Patent Literatures 1 to 4). A mirror display includes a mirror film provided on the viewing surface side of a display device so that the display device can function as a mirror. The mirror display provides images owing to display light emitted from the display device and is also usable as a mirror by reflecting external light. Known examples of a mirror layer include optical members with reflecting function such as reflective polarizing layers (e.g. Patent Literature 5), dielectric multilayer films (e.g. Patent Literature 6), and vapor-deposited metal films.

In such a mirror display, for example, if a mirror film (e.g. a reflective polarizing layer) alone is disposed on the viewing surface side of the liquid crystal display device, the mirror film may deflect to cause degradation such as distortion of a mirror image (reflected image) of the mirror. In order to prevent this problem, a configuration including a mirror film that includes an adhesive layer (e.g. Patent Literatures 7 to 9) in addition to the mirror layer has been employed in some cases, so that the mirror film attached to the substrate is used as a mirror plate. Meanwhile, in the cases where the substrate has an arithmetic average roughness of more than 0.04 μm on the surface to be attached to the mirror film (on the adhesive layer side), streaks observed to the naked eye have been reported due to the smoothness (irregularities) of the substrate (e.g. Patent Literature 10). Also, a method for preventing scratches on the mirror plate has been known, which is to dispose a hard coat layer (e.g. Patent Literature 11) on the surface opposite to the adhesive layer side of the mirror film as needed.

CITATION LIST

Patent Literature

Patent Literature 1: JP 2004-125885 A
Patent Literature 2: JP 2003-241175 A
Patent Literature 3: JP H11-15392 A
Patent Literature 4: JP 2004-085590 A
Patent Literature 5: JP 2008-52294 A
Patent Literature 6: WO 2007/020861
Patent Literature 7: JP 2009-157352 A
Patent Literature 8: JP 2012-133308 A
Patent Literature 9: JP 2011-94150 A
Patent Literature 10: JP 2002-365432 A
Patent Literature 11: JP 2008-151998 A

SUMMARY OF INVENTION

Technical Problem

Unfortunately, some mirror plates with certain configurations cause orange peel-like unevenness on a mirror image of the mirror (hereinafter, also simply referred to as a mirror image) even if the mirror film is attached to a flat substrate. This may degrade the mirror plate.

Such orange peel-like unevenness causes problems not only in the case of actively viewing a mirror image, such as applying makeup while looking at a viewer's own face in the mirror plate, but also in the case of passively viewing a mirror image, where the mirror plate comes into view. For example, even in the case where a viewer unintentionally sees his/her clothing or wallpaper pattern reflected in the mirror plate, the viewer may have uncomfortable feeling when he/she notices the orange peel-like unevenness on the pattern. The problem of orange peel-like unevenness has not been fully considered, and thus the solution for this problem has not been found. For example, Patent Literatures 1 to 11 include no disclosure focusing on such orange peel-like unevenness and thus fail to solve the above problem.

The present invention has been made under the current situation in the art, and aims to provide a mirror plate capable of suppressing the occurrence of orange peel-like unevenness, and a mirror display including the mirror plate.

Solution to Problem

The present inventors investigated the cause for the orange peel-like unevenness and found that the direct cause was wrinkles formed on the surface of or inside the mirror film. Further investigation revealed that an adhesive layer and a hard coat layer, which are disposed for practical use of a mirror film, actually induce wrinkles as described in the below (1) and (2).

(1) An adhesive layer has wrinkles on its surface due to microgel or the phenomenon of convection between application and drying.
(2) A hard coat layer has wrinkles on its surface due to microgel or the phenomenon of convection between application and drying and also has wrinkles in the layer itself due to the shrinkage on curing of the coating film.

The inventors found that the adhesive layer and hard coat layer thus have wrinkles which induce wrinkles of the mirror layer. The inventors also found that a large arithmetic average roughness (low smoothness) of the substrate on the surface to be attached to the mirror film also affects the occurrence of wrinkles.

Then, the inventors studied various methods for suppressing the occurrence of such wrinkles. Regarding (1), a method of reducing the thickness of the adhesive layer is effective in order to suppress the phenomenon of convection during application of the adhesive layer. The inventors conducted intensive studies for suppressing the occurrence of orange peel-like unevenness to find that making the relative thickness of the adhesive layer based on the thickness of the mirror layer a certain value or smaller is particularly effective. Regarding (2), a method for reducing the thickness of the hard coat layer (including the case of making the thickness zero, i.e., disposing no hard coat layer) is effective in order to suppress the convection during application of the hard coat layer and/or to suppress the shrinkage on curing of the coating film of the hard coat layer. Moreover, the inventors conducted intensive studies for suppressing the occurrence of orange peel-like unevenness to find that making the relative thickness of the hard coat layer based on the thickness of the mirror layer a certain value or smaller is particularly effective. The inventors also found that making the arithmetic average roughness of the substrate on the surface to be attached to the mirror film a certain value or smaller also effectively suppresses the occurrence of wrinkles. This finding led them to a fine solution of the above problem and to completion of the present invention.

Specifically, an aspect of the present invention may be a mirror plate (hereinafter, also referred to as a first mirror plate of the present invention) including a mirror film including a mirror layer and an adhesive layer, and a substrate, the adhesive layer being attached to one surface of the substrate, the one surface of the substrate having an arithmetic average roughness of less than 0.03 μm, the mirror film including no hard coat layer containing cured resin, the thicknesses of the mirror layer and the adhesive layer having a relation satisfying: tA/tM≤0.18, where tM represents the thickness of the mirror layer and tA represents the thickness of the adhesive layer.

Another aspect of the present invention may be a mirror plate (hereinafter, also referred to as a second mirror plate of the present invention) including a mirror film including a mirror layer, an adhesive layer, and a hard coat layer, and a substrate, the adhesive layer being disposed on one surface of the mirror layer and being attached to one surface of the substrate, the hard coat layer being disposed on the other surface of the mirror layer and containing cured resin, the one surface of the substrate having an arithmetic average roughness of less than 0.03 μm, the thicknesses of the mirror layer, the adhesive layer, and the hard coat layer having a relation satisfying: tA/tM≤0.18 and tH/tM≤0.13, where tM represents the thickness of the mirror layer, tA represents the thickness of the adhesive layer, and tH represents the thickness of the hard coat layer.

Still another aspect of the present invention may be a mirror display including the mirror plate and a display device, the display device being disposed on the back surface side of the mirror plate.

Advantageous Effects of Invention

The present invention can provide a mirror plate capable of suppressing the occurrence of orange peel-like unevenness, and a mirror display including the mirror plate.

DESCRIPTION OF EMBODIMENTS

Figure 1:
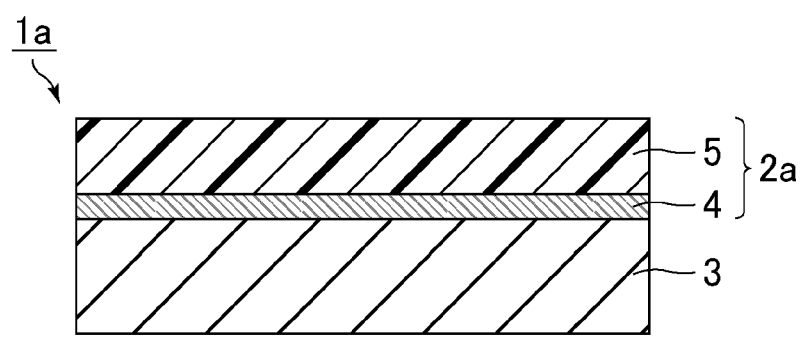
FIG. 1 is a schematic cross sectional view showing a mirror plate of Embodiment 1.

The present invention will be described in detail below by way of, but not limited to, the following embodiments (examples) referring to the drawings. The configurations of the respective embodiments (examples) may be employed in appropriate combination or may be modified as long as the combination or the modification is not beyond the spirit of the present invention.

Embodiment 1

Embodiment 1 relates to the first mirror plate of the present invention.

FIG. 1 is a schematic cross sectional view showing a mirror plate of Embodiment 1. As shown in FIG. 1, a mirror plate 1a includes a mirror film 2a and a substrate 3. The mirror film 2a includes, in the order from the substrate 3 side, an adhesive layer 4 and a mirror layer 5. The adhesive layer 4 is attached to one surface of the substrate 3. The mirror film 2a includes no hard coat layer containing cured resin.

The mirror layer 5 is a translucent layer with a property reflecting incident light. The mirror layer 5 has a reflectance for natural light of preferably 40% or more, more preferably 50% or more. The term "reflectance" as used herein refers to "luminous reflectance" unless otherwise noted. The mirror layer 5 may partly absorb incident light. The mirror layer 5 may be formed of any material and by any method. For example, a reflective polarizing layer, a dielectric multilayer film, or a vapor-deposited metal film may be used. In the case of constituting a mirror display including the mirror plate 1a and a display device, the mirror layer 5 is preferably a dielectric multilayer film or a reflective polarizing layer, particularly preferably a reflective polarizing layer, in order to achieve both of the visibility of a mirror image and the visibility of an image provided by the display device (hereinafter, also simply referred to as an image) with enhanced light utilization efficiency. The material occupying most part of the mirror layer 5 is preferably resin, more preferably thermoplastic resin, particularly preferably polyester resin (e.g. polyethylene terephthalate (PET), polyethylene naphthalate (PEN)) which is inexpensive and has high reliability and good moldability, in order to achieve better moldability. The reflectance and transmittance of the mirror layer 5 are not particularly limited, and may be flexibly adjusted by increasing or decreasing the thickness of the vapor-deposited metal film or dielectric multilayer film, by stacking two or more reflective polarizing layers such that the respective transmission axes thereof are at different azimuth angles, or by employing two or more kinds of mirror layers. The mirror layer 5 may further have infrared absorption function and ultraviolet absorption function. The thickness of the mirror layer 5 is not particularly limited, and is preferably not smaller than 28 μm and not larger than 155 μm. Too thin a mirror layer 5 may make it difficult to achieve a sufficient reflectance as a mirror layer. Too thick a mirror layer 5 may increase the thickness of the mirror film 2a (mirror plate 1a) to degrade the practicability.

A reflective polarizing layer reflects incident light with a specific polarization more strongly than incident light perpendicular to the incident light with a specific polarization. The reflective polarizing layer may be formed of any material or by any method. Examples of the reflective polarizing layer include super multilayer reflective polarizing layers having a birefringent multilayer structure. Examples of the super multilayer reflective polarizing layer include a laminate of two kinds of polymer materials A and B as described in Patent Literature 5. Preferable examples of the polymer material A include crystalline naphthalene dicarboxylic acid polyesters such as polyethylene naphthalate (PEN). Preferable examples of the polymer material B include a copolyester (coPEN) of naphthalene dicarboxylic acid and terephthalic acid or isophthalic acid, more preferably a 70 naphthalate/30 terephthalate copolymer (coPEN). Such a super multilayer reflective polarizing layer may be produced, for example, by alternately stacking layers of the polymer material A and layers of the polymer material B to form a multilayer laminate film using an extruder, a multilayer feed block, and a multiplier, and stretching the laminate film. Examples of the reflective polarizing layer include, in addition to the super multilayer reflective polarizing layer, a reflective polarizing layer utilizing the selective reflection phenomenon of a cholesteric liquid crystal.

The dielectric multilayer film has a reflectance controlled to a desired value on the basis of the principle of light interference. The dielectric multilayer film may be formed of any material and by any method. Examples of the dielectric multilayer film include those in which a large number of dielectric thin films (resin) with different refractive indices are stacked. Such a dielectric multilayer film may be produced, for example, by alternately stacking layers of two different polyester materials using the materials and the production method described in Patent Literature 6. Unlike the reflective polarizing layer, the dielectric multilayer film does not have polarization capability.

The vapor-deposited metal film may be one in which metal is deposited on a PET film, for example. Unlike the reflective polarizing layer, the vapor-deposited metal film does not have polarization capability.

The adhesive layer 4 may be one which is excellent in adhesion and has transparency and smoothness to the extent that the visibilities of the mirror image and image are not impaired. The adhesive layer 4 may be made of any material, and may be made by appropriately selecting material (s) including the below listed polymers as described in Patent Literature 7 as a base polymer: acrylic polymers, silicone polymers, polyesters, polyurethanes, polyamides, polyethers, fluorine polymers, and rubber polymers. Particularly preferred is an adhesive layer having appropriate wettability, cohesiveness, and adhesion and being excellent in transparency, weather resistance, and heat resistance, as in the case of using an acrylic polymer. The adhesive layer 4 may be applied by any method, and examples thereof include roll coating, kiss roll coating, gravure coating, reverse coating, roll brushing, spray coating, dip roll coating, bar coating, knife coating, air knife coating, curtain coating, lip coating, and die coating, as described in Patent Literature 8. Particularly preferred is use of a die coater that enables simple application with a small amount of solvent. The thickness of the adhesive layer 4 is not particularly limited, and is preferably not smaller than 5 µm and not larger than 25 µm. Too thin an adhesive layer 4 may weaken the adhesiveness. Too thick an adhesive layer 4 may increase the thickness of the mirror film 2a (mirror plate 1a) to degrade the practicability.

The substrate 3 may be made of any material as long as the arithmetic average roughness (hereinafter, also referred to as Ra) of the adhesive layer 4-side surface is less than 0.03 µm. Examples thereof include glass substrates, acrylic plates, polarizers, and display devices. If a flat wall is employed as the substrate 3, attaching the mirror film 2a to the wall instead of a conventional mirror (e.g. a product in which a metal thin film is vapor-deposited on a glass substrate) can provide a film mirror which eliminates the concern for glass breakage, is inexpensive, has light weight, and may be enlarged. The Ra is measured in conformity with JIS B0601 2001 and can be measured with, for example, an optical interferometric profilometer (trade name: Wyko NT1100) available from Veeco Instruments Inc. or an atomic force microscope (trade name: SPI3800) available from Seiko Instruments Inc. For reference, the Ra of a very flat substrate such as a glass substrate generally used in the display field is not more than 0.001 µm, while the Ra of ground glass is more than 0.2 µm.

The thicknesses of the mirror layer 5 and the adhesive layer 4 have a relation satisfying: $tA/tM \leq 0.18$, where tM represents the thickness of the mirror layer 5 and to represents the thickness of the adhesive layer 4. In order to sufficiently achieve the effects of the present invention, the relation satisfies preferably $tA/tM \leq 0.15$, more preferably $tA/tM \leq 0.14$. The values for the thicknesses of the mirror layer 5 and the adhesive layer 4 are herein measured in micrometer. In addition, in the case of using a laminate including multiple layers (e.g. a laminate in which multiple reflective polarizing layers are stacked) as the mirror layer 5 and disposing the substrate 3 on the viewing surface side, tM represents the thickness of the layer disposed on the side nearest to the substrate 3 (the nearest side to the adhesive layer 4) among the layers of the laminate. Meanwhile, in the case of using a laminate including multiple layers as the mirror layer 5 and disposing the substrate 3 on the side opposite to the viewing surface side, tM represents the thickness of the layer disposed on the side farthest from the substrate 3 (the farthest side from the adhesive layer 4) among the layers of the laminate.

The following describes examples relating to the mirror plate of Embodiment 1.

Example 1

Example 1 is a case of using a reflective polarizing layer as the mirror layer 5 and a glass substrate as the substrate 3. The production process of a mirror plate of Example 1 is described in order hereinbelow.

(a) Formation of Reflective Polarizing Layer

Polyethylene naphthalate (PEN) is prepared as a first material and a 70 naphthalate/30 terephthalate copolymer (coPEN) is prepared as a second material. The first and second materials are separately fed in different extruders and heated to give molten materials, and are each divided into 15 layers. Then, using a multilayer feed block device that can stack the layers of the first material and the layers of the second material alternately and change the thicknesses of the layers continuously such that the maximum thickness of the layers is 3.0 times the minimum thickness of the layers for each of the two kinds of layers, a melt including alternating 30 layers in total is formed. Next, the melt is passed through a multiplier with the stacking state maintained such that the number of layers is five times (hereinafter, also referred to as the doubling number is five) the initial number of layers. Subsequently, the melt having passed through the multiplier is fed in a die coater with the stacking state maintained and cast on the casting drum to provide a multilayer unstretched film. The multilayer unstretched film is then uniaxially stretched to five times the original length in the width direction at 120° C., and the stretched film is heat set for three seconds at 120° C., whereby a reflective polarizing layer (mirror layer 5) is completely formed. The resulting reflective polarizing layer has a thickness (tM) of 29 µm and a reflectance of 50%.

(b) Formation of Adhesive Layer

A solution with a monomer concentration of 50% is prepared by diluting 94.5 parts of butyl acrylate, 5 parts of acrylic acid, and 0.5 parts of 2-hydroxyethyl acrylate with an ethyl acetate solution. To this solution, 0.3 parts of benzoyl peroxide is added relative to 100 parts of the monomer (solids content), and the resulting solution is purged with nitrogen. The nitrogen-purged solution is then reacted under stirring for seven hours at 60° C. to give an acrylic polymer solution. Then, 0.8 parts of trimethylolpropane tolylene diisocyanate and 0.1 parts of γ-glycidyl propane trimethoxysilane are added relative to 100 parts of the acrylic polymer solution to prepare an acrylic adhesive composition (solution). Next, the acrylic adhesive composition is applied to one surface of a silicone-treated, 38-µm-thick PET film with a die coater such that the thickness (tA) of the adhesive layer 4 after drying is 5 µm, and the resulting workpiece is dried for one minute at 155° C., whereby the adhesive layer 4 is completely formed.

(c) Formation of Mirror Film

A PET film with the adhesive layer 4 obtained in the process (b) is attached to one surface of the reflective polarizing layer obtained in the process (a) with the adhesive layer 4 placed in between, and the PET film is peeled off, whereby the mirror film 2a is completely formed.

(d) Formation of Mirror Plate

The mirror film 2a obtained in the process (c) is attached to the glass substrate (substrate 3), whereby the mirror plate 1a is completely formed. Here, the Ra of the adhesive layer 4-side surface of the glass substrate is 0.0005 μm.

Example 2

Example 2 is a case where the doubling number for forming the reflective polarizing layer is six and the thickness (tM) of the reflective polarizing layer is 35 μm. Since the mirror plate of Example 2 is the same as the mirror plate of Example 1 except for the above conditions, the description of the same respects is omitted here.

Example 3

Example 3 is a case where the doubling number for forming the reflective polarizing layer is eight and the thickness (tM) of the reflective polarizing layer is 46 μm. Since the mirror plate of Example 3 is the same as the mirror plate of Example 1 except for the above conditions, the description of the same respects is omitted here.

Example 4

Example 4 is a case where the doubling number for forming the reflective polarizing layer is 10 and the thickness (tM) of the reflective polarizing layer is 58 μm. Since the mirror plate of Example 4 is the same as the mirror plate of Example 1 except for the above conditions, the description of the same respects is omitted here.

Example 5

Example 5 is a case where the doubling number for forming the reflective polarizing layer is 12 and the thickness (tM) of the reflective polarizing layer is 70 μm. Since the mirror plate of Example 5 is the same as the mirror plate of Example 1 except for the above conditions, the description of the same respects is omitted here.

Example 6

Example 6 is a case where the doubling number for forming the reflective polarizing layer is 14 and the thickness (tM) of the reflective polarizing layer is 81 μm. Since the mirror plate of Example 6 is the same as the mirror plate of Example 1 except for the above conditions, the description of the same respects is omitted here.

Example 7

Example 7 is a case where the doubling number for forming the reflective polarizing layer is 16 and the thickness (tM) of the reflective polarizing layer is 93 μm. Since the mirror plate of Example 7 is the same as the mirror plate of Example 1 except for the above conditions, the description of the same respects is omitted here.

Example 8

Example 8 is a case where the doubling number for forming the reflective polarizing layer is 18 and the thickness (tM) of the reflective polarizing layer is 104 μm. Since the mirror plate of Example 8 is the same as the mirror plate of Example 1 except for the above conditions, the description of the same respects is omitted here.

Example 9

Example 9 is a case where the doubling number for forming the reflective polarizing layer is 20 and the thickness (tM) of the reflective polarizing layer is 116 μm. Since the mirror plate of Example 9 is the same as the mirror plate of Example 1 except for the above conditions, the description of the same respects is omitted here.

Example 10

Example 10 is a case where the doubling number for forming the reflective polarizing layer is 26 and the thickness (tM) of the reflective polarizing layer is 151 μm. Since the mirror plate of Example 10 is the same as the mirror plate of Example 1 except for the above conditions, the description of the same respects is omitted here.

Example 11

Example 11 is a case where the doubling number for forming the reflective polarizing layer is 12, the thickness (tM) of the reflective polarizing layer is 70 μm, and the thickness (tA) of the adhesive layer 4 is 12 μm. Since the mirror plate of Example 11 is the same as the mirror plate of Example 1 except for the above conditions, the description of the same respects is omitted here.

Example 12

Example 12 is a case where the doubling number for forming the reflective polarizing layer is 14 and the thickness (tM) of the reflective polarizing layer is 81 μm. Since the mirror plate of Example 12 is the same as the mirror plate of Example 11 except for the above conditions, the description of the same respects is omitted here.

Example 13

Example 13 is a case where the doubling number for forming the reflective polarizing layer is 16 and the thickness (tM) of the reflective polarizing layer is 93 μm. Since the mirror plate of Example 13 is the same as the mirror plate of Example 11 except for the above conditions, the description of the same respects is omitted here.

Example 14

Example 14 is a case where the doubling number for forming the reflective polarizing layer is 18 and the thickness (tM) of the reflective polarizing layer is 104 μm. Since the mirror plate of Example 14 is the same as the mirror plate of Example 11 except for the above conditions, the description of the same respects is omitted here.

Example 15

Example 15 is a case where the doubling number for forming the reflective polarizing layer is 20 and the thickness (tM) of the reflective polarizing layer is 116 μm. Since the mirror plate of Example 15 is the same as the mirror plate of Example 11 except for the above conditions, the description of the same respects is omitted here.

Example 16

Example 16 is a case where the doubling number for forming the reflective polarizing layer is 26 and the thickness (tM) of the reflective polarizing layer is 151 µm. Since the mirror plate of Example 16 is the same as the mirror plate of Example 11 except for the above conditions, the description of the same respects is omitted here.

Example 17

Example 17 is a case where the doubling number for forming the reflective polarizing layer is 26, the thickness (tM) of the reflective polarizing layer is 151 µm, and the thickness (tA) of the adhesive layer 4 is 25 µm. Since the mirror plate of Example 17 is the same as the mirror plate of Example 1 except for the above conditions, the description of the same respects is omitted here.

Example 18

Example 18 is a case of using an acrylic plate as the substrate 3. The Ra of the adhesive layer 4-side surface of the acrylic plate is 0.014 µm. Since the mirror plate of Example 18 is the same as the mirror plate of Example 14 except for the above conditions, the description of the same respects is omitted here.

Example 19

Example 19 is a case of using a polarizer as the substrate 3. The Ra of the adhesive layer 4-side surface of the polarizer is 0.024 µm. Since the mirror plate of Example 19 is the same as the mirror plate of Example 14 except for the above conditions, the description of the same respects is omitted here.

Example 20

Example 20 is a case of using a dielectric multilayer film as the mirror layer 5. The dielectric multilayer film used is obtained by alternately stacking layers of two kinds of polyester materials to form 801 layers in total using the materials and method described in Example 2 of Patent Literature 6. The thickness (tM) of the dielectric multilayer film is 100 µm and the reflectance thereof is 51%. Since the mirror plate of Example 20 is the same as the mirror plate of Example 14 except for the above conditions, the description of the same respects is omitted here.

Example 21

Example 21 is a case of using a dielectric multilayer film as the mirror layer 5. The dielectric multilayer film used is obtained by alternately stacking layers of two kinds of polyester materials to form 801 layers in total using the materials and method described in Example 1 of Patent Literature 6. The thickness (tM) of the dielectric multilayer film is 100 µm and the reflectance thereof is 88%. Since the mirror plate of Example 21 is the same as the mirror plate of Example 14 except for the above conditions, the description of the same respects is omitted here.

Example 22

Example 22 is a case of using a vapor-deposited metal film as the mirror layer 5. The vapor-deposited metal film used is obtained by vapor-depositing aluminum with a purity of 99.9% on a 100-µm-thick PET film with a vacuum evaporator such that the film thickness is 100 nm. The thickness (tM) of the vapor-deposited metal film is 100 µm (the film thickness of aluminum is not considered because it is relatively small), and the reflectance thereof is 85%. The adhesive layer 4 is attached to the PET-film-side surface of the vapor-deposited metal film. Since the mirror plate of Example 22 is the same as the mirror plate of Example 14 except for the above conditions, the description of the same respects is omitted here.

Comparative Embodiment 1

Comparative Embodiment 1 is a case where at least one of the Ra of the adhesive layer 4-side surface of the substrate 3 and to/tM falls within a different range from that in Embodiment 1. Since the mirror plate of Comparative Embodiment 1 is the same as the mirror plate of Embodiment 1 except for the above conditions, the description of the same respects is omitted here.

The following are comparative examples relating to the mirror plate of Comparative Embodiment 1.

Comparative Example 1

Comparative Example 1 is a case where the doubling number for forming the reflective polarizing layer is three and the thickness (tM) of the reflective polarizing layer is 17 µm. Since the mirror plate of Comparative Example 1 is the same as the mirror plate of Example 1 except for the above conditions, the description of the same respects is omitted here.

Comparative Example 2

Comparative Example 2 is a case where the doubling number for forming the reflective polarizing layer is four and the thickness (tM) of the reflective polarizing layer is 23 µm. Since the mirror plate of Comparative Example 2 is the same as the mirror plate of Example 1 except for the above conditions, the description of the same respects is omitted here.

Comparative Example 3

Comparative Example 3 is a case where the doubling number for forming the reflective polarizing layer is three and the thickness (tM) of the reflective polarizing layer is 17 µm. Since the mirror plate of Comparative Example 3 is the same as the mirror plate of Example 11 except for the above conditions, the description of the same respects is omitted here.

Comparative Example 4

Comparative Example 4 is a case where the doubling number for forming the reflective polarizing layer is four and the thickness (tM) of the reflective polarizing layer is 23 µm. Since the mirror plate of Comparative Example 4 is the same as the mirror plate of Example 11 except for the above conditions, the description of the same respects is omitted here.

Comparative Example 5

Comparative Example 5 is a case where the doubling number for forming the reflective polarizing layer is five and the thickness (tM) of the reflective polarizing layer is 29 µm. Since the mirror plate of Comparative Example 5 is the same as the mirror plate of Example 11 except for the above conditions, the description of the same respects is omitted here.

Comparative Example 6

Comparative Example 6 is a case where the doubling number for forming the reflective polarizing layer is six and the thickness (tM) of the reflective polarizing layer is 35 µm. Since the mirror plate of Comparative Example 6 is the same as the mirror plate of Example 11 except for the above conditions, the description of the same respects is omitted here.

Comparative Example 7

Comparative Example 7 is a case where the doubling number for forming the reflective polarizing layer is eight and the thickness (tM) of the reflective polarizing layer is 46 µm. Since the mirror plate of Comparative Example 7 is the same as the mirror plate of Example 11 except for the above conditions, the description of the same respects is omitted here.

Comparative Example 8

Comparative Example 8 is a case where the doubling number for forming the reflective polarizing layer is 10 and the thickness (tM) of the reflective polarizing layer is 58 µm. Since the mirror plate of Comparative Example 8 is the same as the mirror plate of Example 11 except for the above conditions, the description of the same respects is omitted here.

Comparative Example 9

Comparative Example 9 is a case where the doubling number for forming the reflective polarizing layer is three and the thickness (tM) of the reflective polarizing layer is 17 µm. Since the mirror plate of Comparative Example 9 is the same as the mirror plate of Example 17 except for the above conditions, the description of the same respects is omitted here.

Comparative Example 10

Comparative Example 10 is a case where the doubling number for forming the reflective polarizing layer is four and the thickness (tM) of the reflective polarizing layer is 23 µm. Since the mirror plate of Comparative Example 10 is the same as the mirror plate of Example 17 except for the above conditions, the description of the same respects is omitted here.

Comparative Example 11

Comparative Example 11 is a case where the doubling number for forming the reflective polarizing layer is five and the thickness (tM) of the reflective polarizing layer is 29 µm. Since the mirror plate of Comparative Example 11 is the same as the mirror plate of Example 17 except for the above conditions, the description of the same respects is omitted here.

Comparative Example 12

Comparative Example 12 is a case where the doubling number for forming the reflective polarizing layer is six and the thickness (tM) of the reflective polarizing layer is 35 µm. Since the mirror plate of Comparative Example 12 is the same as the mirror plate of Example 17 except for the above conditions, the description of the same respects is omitted here.

Comparative Example 13

Comparative Example 13 is a case where the doubling number for forming the reflective polarizing layer is eight and the thickness (tM) of the reflective polarizing layer is 46 µm. Since the mirror plate of Comparative Example 13 is the same as the mirror plate of Example 17 except for the above conditions, the description of the same respects is omitted here.

Comparative Example 14

Comparative Example 14 is a case where the doubling number for forming the reflective polarizing layer is 10 and the thickness (tM) of the reflective polarizing layer is 58 µm. Since the mirror plate of Comparative Example 14 is the same as the mirror plate of Example 17 except for the above conditions, the description of the same respects is omitted here.

Comparative Example 15

Comparative Example 15 is a case where the doubling number for forming the reflective polarizing layer is 12 and the thickness (tM) of the reflective polarizing layer is 70 µm. Since the mirror plate of Comparative Example 15 is the same as the mirror plate of Example 17 except for the above conditions, the description of the same respects is omitted here.

Comparative Example 16

Comparative Example 16 is a case where the doubling number for forming the reflective polarizing layer is 14 and the thickness (tM) of the reflective polarizing layer is 81 µm. Since the mirror plate of Comparative Example 16 is the same as the mirror plate of Example 17 except for the above conditions, the description of the same respects is omitted here.

Comparative Example 17

Comparative Example 17 is a case where the doubling number for forming the reflective polarizing layer is 16 and the thickness (tM) of the reflective polarizing layer is 93 µm. Since the mirror plate of Comparative Example 17 is the same as the mirror plate of Example 17 except for the above conditions, the description of the same respects is omitted here.

Comparative Example 18

Comparative Example 18 is a case where the doubling number for forming the reflective polarizing layer is 18 and the thickness (tM) of the reflective polarizing layer is 104 µm. Since the mirror plate of Comparative Example 18 is the same as the mirror plate of Example 17 except for the above conditions, the description of the same respects is omitted here.

Comparative Example 19

Comparative Example 19 is a case where the doubling number for forming the reflective polarizing layer is 20 and the thickness (tM) of the reflective polarizing layer is 116 µm. Since the mirror plate of Comparative Example 19 is the same as the mirror plate of Example 17 except for the above conditions, the description of the same respects is omitted here.

Comparative Example 20

Comparative Example 20 is a case of using a polarizer that has underwent an anti-glare (AG) treatment with a haze (diffusivity) of 37% as the substrate 3. The adhesive layer 4 is attached to the surface having underwent the AG treatment of the polarizer, and the Ra of the surface is 0.162 µm. Since the mirror plate of Comparative Example 20 is the same as the mirror plate of Example 14 except for the above conditions, the description of the same respects is omitted here.

Comparative Example 21

Comparative Example 21 is a case of using ground glass having a haze of 62% as the substrate 3. The Ra of the adhesive layer 4-side surface of the ground glass is 0.331 µm. Since the mirror plate of Comparative Example 21 is the same as the mirror plate of Example 14 except for the above conditions, the description of the same respects is omitted here.

[Evaluation Result: Mirror Image Appearance]

Table 1 shows the thickness of the mirror layer 5: tM, the thickness of the adhesive layer 4: tA, tA/tM, the Ra of the adhesive layer 4-side surface of the substrate 3, and the evaluation result for the mirror image appearance, of each of the mirror plates of Examples 1 to 22 and Comparative Examples 1 to 21.

The evaluation method is as follows. Viewers (12 non-specialists) view a mirror image of a fluorescent tube reflected on the mirror plate of each example and evaluate if they see orange peel-like unevenness. The evaluation criteria are as follows. A: no orange peel-like unevenness is observed; B: almost no orange peel-like unevenness is observed; C: some orange peel-like unevenness is observed without uncomfortable feeling; and D: orange peel-like unevenness is observed with uncomfortable feeling. Here, the result evaluated as A, B, or C is considered to achieve the effects of the present invention. The values for tA/tM described in the table are rounded off to three decimal places.

TABLE 1

|  | tM (µm) | tA (µm) | tA/tM | Ra (µm) | Evaluation result |
|---|---|---|---|---|---|
| Comparative Example 1 | 17 | 5 | 0.294 | 0.0005 | D |
| Comparative Example 2 | 23 | 5 | 0.217 | 0.0005 | D |
| Example 1 | 29 | 5 | 0.172 | 0.0005 | C |
| Example 2 | 35 | 5 | 0.143 | 0.0005 | B |
| Example 3 | 46 | 5 | 0.109 | 0.0005 | A |
| Example 4 | 58 | 5 | 0.086 | 0.0005 | A |
| Example 5 | 70 | 5 | 0.071 | 0.0005 | A |
| Example 6 | 81 | 5 | 0.062 | 0.0005 | A |
| Example 7 | 93 | 5 | 0.054 | 0.0005 | A |
| Example 8 | 104 | 5 | 0.048 | 0.0005 | A |
| Example 9 | 116 | 5 | 0.043 | 0.0005 | A |
| Example 10 | 151 | 5 | 0.033 | 0.0005 | A |
| Comparative Example 3 | 17 | 12 | 0.706 | 0.0005 | D |
| Comparative Example 4 | 23 | 12 | 0.522 | 0.0005 | D |
| Comparative Example 5 | 29 | 12 | 0.414 | 0.0005 | D |
| Comparative Example 6 | 35 | 12 | 0.343 | 0.0005 | D |
| Comparative Example 7 | 46 | 12 | 0.261 | 0.0005 | D |
| Comparative Example 8 | 58 | 12 | 0.207 | 0.0005 | D |
| Example 11 | 70 | 12 | 0.171 | 0.0005 | C |
| Example 12 | 81 | 12 | 0.148 | 0.0005 | B |
| Example 13 | 93 | 12 | 0.129 | 0.0005 | A |
| Example 14 | 104 | 12 | 0.115 | 0.0005 | A |
| Example 15 | 116 | 12 | 0.103 | 0.0005 | A |
| Example 16 | 151 | 12 | 0.079 | 0.0005 | A |
| Comparative Example 9 | 17 | 25 | 1.471 | 0.0005 | D |
| Comparative Example 10 | 23 | 25 | 1.087 | 0.0005 | D |
| Comparative Example 11 | 29 | 25 | 0.862 | 0.0005 | D |
| Comparative Example 12 | 35 | 25 | 0.714 | 0.0005 | D |
| Comparative Example 13 | 46 | 25 | 0.543 | 0.0005 | D |
| Comparative Example 14 | 58 | 25 | 0.431 | 0.0005 | D |
| Comparative Example 15 | 70 | 25 | 0.357 | 0.0005 | D |
| Comparative Example 16 | 81 | 25 | 0.309 | 0.0005 | D |
| Comparative Example 17 | 93 | 25 | 0.269 | 0.0005 | D |
| Comparative Example 18 | 104 | 25 | 0.240 | 0.0005 | D |
| Comparative Example 19 | 116 | 25 | 0.216 | 0.0005 | D |
| Example 17 | 151 | 25 | 0.166 | 0.0005 | C |
| Example 18 | 104 | 12 | 0.115 | 0.014 | A |
| Example 19 | 104 | 12 | 0.115 | 0.024 | A |
| Comparative Example 20 | 104 | 12 | 0.115 | 0.162 | D |
| Comparative Example 21 | 104 | 12 | 0.115 | 0.331 | D |
| Example 20 | 100 | 12 | 0.120 | 0.0005 | A |
| Example 21 | 100 | 12 | 0.120 | 0.0005 | A |
| Example 22 | 100 | 12 | 0.120 | 0.0005 | A |

As shown in Table 1, all of the mirror plates of Examples 1 to 22 are evaluated to have better mirror image appearance than the mirror plates of Comparative Examples 1 to 21. In particular, the mirror plates of Examples 3 to 10, 13 to 16, and 18 to 22 are evaluated that the mirror image has no orange peel-like unevenness and is thus of very high quality. In order to sufficiently suppress the occurrence of orange peel-like unevenness, tA/tM≤0.15 is preferred, and tA/tM≤0.14 is more preferred.

In contrast, the mirror plates of Comparative Examples 1 to 21 cause a mirror image with orange peel-like unevenness, giving very uncomfortable feeling. The table indicates that even if the Ra of the adhesive layer 4-side surface of the substrate 3 is the same as those of Examples 1 to 17 and 20 to 22 as in the mirror plates of Comparative Examples 1 to 19, a large value for tA/tM (tA/tM>0.18) causes orange peel-like unevenness. The table also indicates that even if the value for tA/tM is the same as those of Examples 14, 18, and 19 as in the mirror plates of Comparative Examples 20 and 21, a large value for the Ra of the adhesive layer 4-side surface of the substrate 3 (Ra of 0.03 µm or more) causes orange peel-like unevenness.

[Evaluation Result: Image Clarity]

Table 2 shows the results for the image clarity of the mirror plates of Examples 2, 7, 14, and 18 to 22 and Comparative Examples 2, 20, and 21, in addition to the items (excluding tA/tM) shown in Table 1 for those mirror plates.

The image clarity shows a degree of how clearly the image of an object reflected on the surface of a member (corresponding to the mirror plate in the present invention) is seen without distortion. The image clarity is measured in conformity with ASTM-D5767-2004. The measuring device used is an image clarity measuring device (trade name: ICM-1) available from Suga Test Instruments Co., Ltd., and the reflectance measurement is performed at an angle of incidence of 45°. In Table 2, the image clarity G is calculated from the following formula (1) by measuring the maximum reflectance M1 and the minimum reflectance m1, the reflectances being measured by irradiating a 0.25-mm-width optical comb with transmitted light incident on the mirror plate of each example from the substrate 3-side surface, the formula (1) being:

$$\text{Image clarity } G(\%)=100\times(M1-m1)/(M1+m1) \qquad (1).$$

Meanwhile, the image clarity F is calculated from the following formula (2) by measuring the maximum reflectance M2 and the minimum reflectance m2, the reflectances being measured by irradiating a 0.25-mm-width optical comb with transmitted light incident on the mirror plate of each example from the mirror film 2a-side surface, the formula (2) being:

$$\text{Image clarity } F(\%)=100\times(M2-m2)/(M2+m2) \qquad (2).$$

TABLE 2

| | tM (μm) | tA (μm) | Ra (μm) | Image Clarity G (%) | Image Clarity F (%) | Evaluation result |
|---|---|---|---|---|---|---|
| Comparative Example 2 | 23 | 5 | 0.0005 | 42 | 73 | D |
| Example 2 | 35 | 5 | 0.0005 | 45 | 75 | B |
| Example 7 | 93 | 5 | 0.0005 | 86 | 88 | A |
| Example 14 | 104 | 12 | 0.0005 | 82 | 82 | A |
| Example 18 | 104 | 12 | 0.014 | 81 | 81 | A |
| Example 19 | 104 | 12 | 0.024 | 75 | 76 | A |
| Comparative Example 20 | 104 | 12 | 0.162 | 32 | 34 | D |
| Comparative Example 21 | 104 | 12 | 0.331 | 28 | 28 | D |
| Example 20 | 100 | 12 | 0.0005 | 84 | 83 | A |
| Example 21 | 100 | 12 | 0.0005 | 83 | 83 | A |
| Example 22 | 100 | 12 | 0.0005 | 84 | 84 | A |

As shown in Table 2, all of the mirror plates of Examples 2, 7, 14, and 18 to 22 have higher image clarities G and F than the mirror plates of Comparative Examples 2, 20, and 21. In particular, all of the mirror plates of Examples 7, 14, 18, and 20 to 22 have image clarities G and F of higher than 80% and are evaluated to have very excellent image clarity. Consideration of the above along with the evaluation results for the mirror image appearance indicates that the image clarities G and F can be taken as indices relating to the mirror image appearance and are preferably 45% or higher, more preferably 60% or higher, still more preferably 80% or higher. In addition, the comparison of Examples 14, 18, and 19 with Comparative Examples 20 and 21, in which tM and to are the same as each other and the Ra's of the adhesive layer 4-side surface of the substrate 3 are different from each other, indicates that the image clarities G and F increase as the Ra decreases. Accordingly, in order to achieve more enhanced image clarities G and F, the Ra of the adhesive layer 4-side surface of the substrate 3 is preferably 0.014 μm or less, more preferably 0.001 μm or less, still more preferably 0.0005 μm or less.

Other Preferred Examples

A mirror display including the first mirror plate of the present invention and a display device may be formed. For example, a mirror display including the mirror plate of Example 14 and a liquid crystal display device may be formed. In this case, the liquid crystal display device is disposed on the back surface side of the mirror plate to face the mirror film. Instead of the mirror plate of Example 14, the mirror plate of Example 18, 20, or the like may be used. Also, the liquid crystal display device may be replaced by, for example, a different display device such as a plasma display device, an organic electroluminescence display device, or an inorganic electroluminescence display device. Such a mirror display can function both as a mirror and as a display for displaying images and can suppress the occurrence of orange peel-like unevenness.

The first mirror plate of the present invention can also replace a conventional mirror. For example, if a flat wall is employed as a substrate instead of the glass substrate in the mirror plate of Example 21 or 22, attaching the mirror film to the wall can provide a film mirror which eliminates the concern for glass breakage, is inexpensive, has light weight, and may be enlarged.

Embodiment 2

Embodiment 2 relates to the second mirror plate of the present invention. Since the mirror plate of Embodiment 2 is the same as the mirror plate of Embodiment 1 except that the mirror film includes a hard coat layer, the description of the same respects is omitted here.

Figure 2:
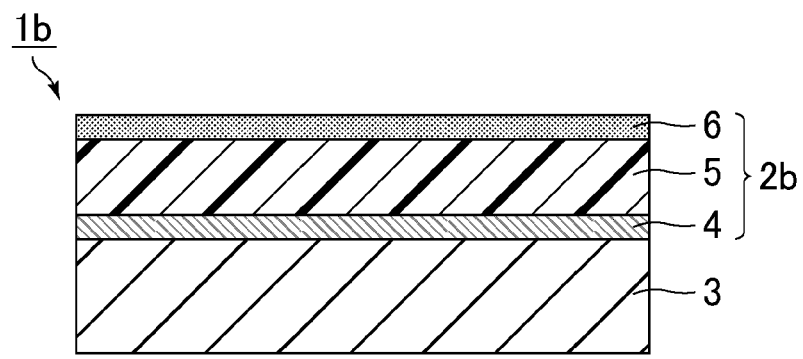
FIG. 2 is a schematic cross sectional view showing a mirror plate of Embodiment 2.

FIG. 2 is a schematic cross sectional view showing a mirror plate of Embodiment 2. As shown in FIG. 2, a mirror plate 1b includes a mirror film 2b and the substrate 3. The mirror film 2b includes, in the order from the substrate 3 side, the adhesive layer 4, the mirror layer 5, and a hard coat layer 6. The adhesive layer 4 is disposed on one surface of the mirror layer 5 and attached to one surface of the substrate 3. The hard coat layer 6 is disposed on the surface opposite to the adhesive layer 4 side of the mirror layer 5.

The hard coat layer 6 may be any hard coat layer containing cured resin and excellent in the surface hardness. The hard coat layer 6 may be formed of any material and by any method. For example, UV curable resin or thermosetting resin may be used. Examples of UV curable resin include various kinds of resin such as polyester resin, acrylic resin, urethane resin, silicone resin, and epoxy resin, as described in Patent Literature 11. Among these, preferred are those containing a UV polymerizable functional group, more preferably those containing an acrylic monomer or oligomer which contains two or more, particularly preferably three to six, functional groups. The hard coat layer 6 may be applied by any method, and examples thereof include roll coating, kiss roll coating, gravure coating, reverse coating, roll brushing, spray coating, dip roll coating, bar coating, knife coating, air knife coating, curtain coating, lip coating, and die coating. Particularly preferred is use of a die coater, which enables simple application with a small amount of solvent. The thickness of the hard coat layer 6 is not particularly limited, and is preferably not smaller than 4 μm and not larger than 7 μm. Too thin a hard coat layer 6 may degrade durability while reducing the hardness. Too thick a hard coat layer 6 may increase the thickness of the mirror film 2b (mirror plate 1b) to degrade the practicability.

The thicknesses of the mirror layer 5, adhesive layer 4, and hard coat layer 6 have a relation satisfying: tA/tM≤0.18 and tH/tM≤0.13, where tM represents the thickness of the mirror layer 5, to represents the thickness of the adhesive layer 4, and tH represents the thickness of the hard coat layer 6. In order to sufficiently achieve the effects of the present invention, the relation satisfies preferably tA/tM≤0.15 and tH/tM≤0.12, more preferably tA/tM≤0.14 and tH/tM≤0.10. The values for the thicknesses of the mirror layer 5, adhesive layer 4, and hard coat layer 6 are herein measured in micrometer. In addition, in the case of using a laminate including multiple layers (e.g. a laminate in which multiple reflective polarizing layers are stacked) as the mirror layer 5 and disposing the substrate 3 on the viewing surface side, tM represents the thickness of the layer disposed on the side nearest to the substrate 3 (the nearest side to the adhesive layer 4) among the layers of the laminate. Meanwhile, in the case of using a laminate including multiple layers as the mirror layer 5 and disposing the substrate 3 on the side opposite to the viewing surface side, tM represents the thickness of the layer disposed on the side farthest from the substrate 3 (the farthest side from the adhesive layer 4) among the layers of the laminate.

The following are examples relating to the mirror plate of Embodiment 2.

Example 23

Example 23 is a case of using a reflective polarizing layer as the mirror layer 5, a glass substrate as the substrate 3, and the hard coat layer 6 containing UV curable resin. The production process of a mirror plate of Example 23 is described in order hereinbelow.

(a) Formation of Reflective Polarizing Layer

Polyethylene naphthalate (PEN) is prepared as a first material and a 70 naphthalate/30 terephthalate copolymer (coPEN) is prepared as a second material. The first and second materials are separately fed in different extruders and heated to give molten materials, and are each divided into 15 layers. Then, using a multilayer feed block device that can stack the layers of the first material and the layers of the second material alternately and change the thicknesses of the layers continuously such that the maximum thickness of the layers is 3.0 times the minimum thickness of the layers for each of the two kinds of layers, a melt including alternating 30 layers in total is formed. Next, the melt is passed through a multiplier with the stacking state maintained such that the number of layers is six times (hereinafter, also referred to as the doubling number is six) the initial number of layers. Subsequently, the melt having passed through the multiplier is fed in a die coater with the stacking state maintained and cast on the casting drum to provide a multilayer unstretched film. The multilayer unstretched film is then uniaxially stretched to five times the original length in the width direction at 120° C., and the stretched film is heat set for three seconds at 120° C., whereby a reflective polarizing layer (mirror layer 5) is completely formed. The resulting reflective polarizing layer has a thickness (tM) of 35 µm and a reflectance of 50%.

(b) Formation of Hard Coat Layer

A material for forming the hard coat layer 6 is prepared as follows. A leveling agent is added to UV curable resin consisting of an isocyanuric acid-based acrylate, pentaerythritol triacrylate, and isophorone diisocyanate polyurethane. The resulting resin is diluted with ethyl acetate such that the solid concentration is 50 wt %, whereby the material for forming the hard coat layer 6 is prepared. The material for forming the hard coat layer 6 is applied to one surface of the reflective polarizing layer obtained in the process (a) with a die coater to form a coating film. Here, the thickness of the coating film is adjusted such that the thickness (tH) of the hard coat layer 6 after drying is 4 µm. Next, the coating film is dried by heating at 100° C. for one minute. Then, the dried coating film is irradiated with ultraviolet rays with a cumulative amount of light of 300 mJ/cm$^2$ using a high-pressure mercury lamp to perform curing treatment. Thereby, a reflective polarizing layer with the hard coat layer 6 is completely formed.

(c) Formation of Adhesive Layer

A solution with a monomer concentration of 50% is prepared by diluting 94.5 parts of butyl acrylate, 5 parts of acrylic acid, and 0.5 parts of 2-hydroxyethyl acrylate with an ethyl acetate solution. To this solution, 0.3 parts of benzoyl peroxide is added relative to 100 parts of the monomer (solids content), and the resulting solution is purged with nitrogen. The nitrogen-purged solution is then reacted under stirring for seven hours at 60° C. to give an acrylic polymer solution. Then, 0.8 parts of trimethylolpropane tolylene diisocyanate and 0.1 parts of γ-glycidyl propane trimethoxysilane are added relative to 100 parts of the acrylic polymer solution to prepare an acrylic adhesive composition (solution). Next, the acrylic adhesive composition is applied to one surface of a silicone-treated, 38-µm-thick PET film with a die coater such that the thickness (tA) of the adhesive layer 4 after drying is 5 µm, and the resulting workpiece is dried for one minute at 155° C., whereby the adhesive layer 4 is completely formed.

(d) Formation of Mirror Film

A PET film with the adhesive layer 4 obtained in the process (c) is attached to the reflective polarizing layer with the hard coat layer 6 obtained in the process (b) on the surface opposite to the hard coat layer 6-side surface with the adhesive layer 4 placed in between, and the PET film is peeled off, whereby the mirror film 2b is completely formed.

(e) Formation of Mirror Plate

The mirror film 2b obtained in the process (d) is attached to the glass substrate (substrate 3), whereby the mirror plate 1b is completely formed. Here, the Ra of the adhesive layer 4-side surface of the glass substrate is 0.0005 µm.

Example 24

Example 24 is a case where the doubling number for forming the reflective polarizing layer is eight and the thickness (tM) of the reflective polarizing layer is 46 µm. Since the mirror plate of Example 24 is the same as the mirror plate of Example 23 except for the above conditions, the description of the same respects is omitted here.

Example 25

Example 25 is a case where the doubling number for forming the reflective polarizing layer is 10 and the thickness (tM) of the reflective polarizing layer is 58 µm. Since the mirror plate of Example 25 is the same as the mirror plate of Example 23 except for the above conditions, the description of the same respects is omitted here.

Example 26

Example 26 is a case where the doubling number for forming the reflective polarizing layer is 12 and the thickness (tM) of the reflective polarizing layer is 70 µm. Since the mirror plate of Example 26 is the same as the mirror plate of Example 23 except for the above conditions, the description of the same respects is omitted here.

Example 27

Example 27 is a case where the doubling number for forming the reflective polarizing layer is 14 and the thickness (tM) of the reflective polarizing layer is 81 µm. Since the mirror plate of Example 27 is the same as the mirror plate of Example 23 except for the above conditions, the description of the same respects is omitted here.

Example 28

Example 28 is a case where the doubling number for forming the reflective polarizing layer is 16 and the thickness (tM) of the reflective polarizing layer is 93 µm. Since the mirror plate of Example 28 is the same as the mirror plate of Example 23 except for the above conditions, the description of the same respects is omitted here.

Example 29

Example 29 is a case where the doubling number for forming the reflective polarizing layer is 18 and the thickness (tM) of the reflective polarizing layer is 104 µm. Since the mirror plate of Example 29 is the same as the mirror plate of Example 23 except for the above conditions, the description of the same respects is omitted here.

Example 30

Example 30 is a case where the doubling number for forming the reflective polarizing layer is 20 and the thickness (tM) of the reflective polarizing layer is 116 µm. Since the mirror plate of Example 30 is the same as the mirror plate of Example 23 except for the above conditions, the description of the same respects is omitted here.

Example 31

Example 31 is a case where the doubling number for forming the reflective polarizing layer is 26 and the thickness (tM) of the reflective polarizing layer is 151 µm. Since the mirror plate of Example 31 is the same as the mirror plate of Example 23 except for the above conditions, the description of the same respects is omitted here.

Example 32

Example 32 is a case where the doubling number for forming the reflective polarizing layer is 12, the thickness (tM) of the reflective polarizing layer is 70 µm, and the thickness (tA) of the adhesive layer 4 is 12 µm. Since the mirror plate of Example 32 is the same as the mirror plate of Example 23 except for the above conditions, the description of the same respects is omitted here.

Example 33

Example 33 is a case where the doubling number for forming the reflective polarizing layer is 14 and the thickness (tM) of the reflective polarizing layer is 81 µm. Since the mirror plate of Example 33 is the same as the mirror plate of Example 32 except for the above conditions, the description of the same respects is omitted here.

Example 34

Example 34 is a case where the doubling number for forming the reflective polarizing layer is 16 and the thickness (tM) of the reflective polarizing layer is 93 µm. Since the mirror plate of Example 34 is the same as the mirror plate of Example 32 except for the above conditions, the description of the same respects is omitted here.

Example 35

Example 35 is a case where the doubling number for forming the reflective polarizing layer is 18 and the thickness (tM) of the reflective polarizing layer is 104 µm. Since the mirror plate of Example 35 is the same as the mirror plate of Example 32 except for the above conditions, the description of the same respects is omitted here.

Example 36

Example 36 is a case where the doubling number for forming the reflective polarizing layer is 20 and the thickness (tM) of the reflective polarizing layer is 116 µm. Since the mirror plate of Example 36 is the same as the mirror plate of Example 32 except for the above conditions, the description of the same respects is omitted here.

Example 37

Example 37 is a case where the doubling number for forming the reflective polarizing layer is 26 and the thickness (tM) of the reflective polarizing layer is 151 µm. Since the mirror plate of Example 37 is the same as the mirror plate of Example 32 except for the above conditions, the description of the same respects is omitted here.

Example 38

Example 38 is a case where the doubling number for forming the reflective polarizing layer is 26, the thickness (tM) of the reflective polarizing layer is 151 µm, and the thickness (tA) of the adhesive layer 4 is 25 µm. Since the mirror plate of Example 38 is the same as the mirror plate of Example 23 except for the above conditions, the description of the same respects is omitted here.

Example 39

Example 39 is a case where the doubling number for forming the reflective polarizing layer is 10, the thickness (tM) of the reflective polarizing layer is 58 µm, and the thickness (tH) of the hard coat layer 6 is 7 µm. Since the mirror plate of Example 39 is the same as the mirror plate of Example 23 except for the above conditions, the description of the same respects is omitted here.

Example 40

Example 40 is a case where the doubling number for forming the reflective polarizing layer is 12 and the thickness (tM) of the reflective polarizing layer is 70 µm. Since the mirror plate of Example 40 is the same as the mirror plate of Example 39 except for the above conditions, the description of the same respects is omitted here.

Example 41

Example 41 is a case where the doubling number for forming the reflective polarizing layer is 14 and the thickness (tM) of the reflective polarizing layer is 81 µm. Since the mirror plate of Example 41 is the same as the mirror plate of Example 39 except for the above conditions, the description of the same respects is omitted here.

Example 42

Example 42 is a case where the doubling number for forming the reflective polarizing layer is 16 and the thickness (tM) of the reflective polarizing layer is 93 µm. Since the mirror plate of Example 42 is the same as the mirror plate

Example 43

Example 43 is a case where the doubling number for forming the reflective polarizing layer is 18 and the thickness (tM) of the reflective polarizing layer is 104 μm. Since the mirror plate of Example 43 is the same as the mirror plate of Example 39 except for the above conditions, the description of the same respects is omitted here.

Example 44

Example 44 is a case where the doubling number for forming the reflective polarizing layer is 20 and the thickness (tM) of the reflective polarizing layer is 116 μm. Since the mirror plate of Example 44 is the same as the mirror plate of Example 39 except for the above conditions, the description of the same respects is omitted here.

Example 45

Example 45 is a case where the doubling number for forming the reflective polarizing layer is 26 and the thickness (tM) of the reflective polarizing layer is 151 μm. Since the mirror plate of Example 45 is the same as the mirror plate of Example 39 except for the above conditions, the description of the same respects is omitted here.

Example 46

Example 46 is a case where the doubling number for forming the reflective polarizing layer is 12, the thickness (tM) of the reflective polarizing layer is 70 μm, and the thickness (tA) of the adhesive layer 4 is 12 μm. Since the mirror plate of Example 46 is the same as the mirror plate of Example 39 except for the above conditions, the description of the same respects is omitted here.

Example 47

Example 47 is a case where the doubling number for forming the reflective polarizing layer is 14 and the thickness (tM) of the reflective polarizing layer is 81 μm. Since the mirror plate of Example 47 is the same as the mirror plate of Example 46 except for the above conditions, the description of the same respects is omitted here.

Example 48

Example 48 is a case where the doubling number for forming the reflective polarizing layer is 16 and the thickness (tM) of the reflective polarizing layer is 93 μm. Since the mirror plate of Example 48 is the same as the mirror plate of Example 46 except for the above conditions, the description of the same respects is omitted here.

Example 49

Example 49 is a case where the doubling number for forming the reflective polarizing layer is 18 and the thickness (tM) of the reflective polarizing layer is 104 μm. Since the mirror plate of Example 49 is the same as the mirror plate of Example 46 except for the above conditions, the description of the same respects is omitted here.

Example 50

Example 50 is a case where the doubling number for forming the reflective polarizing layer is 20 and the thickness (tM) of the reflective polarizing layer is 116 μm. Since the mirror plate of Example 50 is the same as the mirror plate of Example 46 except for the above conditions, the description of the same respects is omitted here.

Example 51

Example 51 is a case where the doubling number for forming the reflective polarizing layer is 26 and the thickness (tM) of the reflective polarizing layer is 151 μm. Since the mirror plate of Example 51 is the same as the mirror plate of Example 46 except for the above conditions, the description of the same respects is omitted here.

Example 52

Example 52 is a case where the doubling number for forming the reflective polarizing layer is 26, the thickness (tM) of the reflective polarizing layer is 151 μm, and the thickness (tA) of the adhesive layer 4 is 25 μm. Since the mirror plate of Example 52 is the same as the mirror plate of Example 39 except for the above conditions, the description of the same respects is omitted here.

Example 53

Example 53 is a case of using an acrylic plate as the substrate 3. The Ra of the adhesive layer 4-side surface of the acrylic plate is 0.014 μm. Since the mirror plate of Example 53 is the same as the mirror plate of Example 35 except for the above conditions, the description of the same respects is omitted here.

Example 54

Example 54 is a case of using a polarizer as the substrate 3. The Ra of the adhesive layer 4-side surface of the polarizer is 0.024 μm. Since the mirror plate of Example 54 is the same as the mirror plate of Example 35 except for the above conditions, the description of the same respects is omitted here.

Example 55

Example 55 is a case of using a dielectric multilayer film as the mirror layer 5. The dielectric multilayer film used is obtained by alternately stacking layers of two kinds of polyester materials to form 801 layers in total using the materials and method described in Example 2 of Patent Literature 6. The thickness (tM) of the dielectric multilayer film is 100 μm and the reflectance thereof is 51%. Since the mirror plate of Example 55 is the same as the mirror plate of Example 35 except for the above conditions, the description of the same respects is omitted here.

Example 56

Example 56 is a case of using a dielectric multilayer film as the mirror layer 5. The dielectric multilayer film used is obtained by alternately stacking layers of two kinds of polyester materials to form 801 layers in total using the materials and method described in Example 1 of Patent Literature 6. The thickness (tM) of the dielectric multilayer film is 100 µm and the reflectance thereof is 88%. Since the mirror plate of Example 56 is the same as the mirror plate of Example 35 except for the above conditions, the description of the same respects is omitted here.

Example 57

Example 57 is a case of using a vapor-deposited metal film as the mirror layer 5. The vapor-deposited metal film used is obtained by vapor-depositing aluminum with a purity of 99.9% on a 100-µm-thick PET film with a vacuum evaporator such that the film thickness is 100 nm. The thickness (tM) of the vapor-deposited metal film is 100 µm (the film thickness of aluminum is not considered because it is relatively small), and the reflectance thereof is 85%. The adhesive layer 4 is attached to the PET-film-side surface of the vapor-deposited metal film. Since the mirror plate of Example 57 is the same as the mirror plate of Example 35 except for the above conditions, the description of the same respects is omitted here.

Example 58

Example 58 is a case of using a dielectric multilayer film as the mirror layer 5 and an acrylic plate as the substrate 3. The dielectric multilayer film used is obtained by alternately stacking layers of two kinds of polyester materials to form 801 layers in total using the materials and method described in Example 1 of Patent Literature 6. The thickness (tM) of the dielectric multilayer film is 100 µm and the reflectance thereof is 88%. The Ra of the adhesive layer 4-side surface of the acrylic plate is 0.014 µm. Since the mirror plate of Example 58 is the same as the mirror plate of Example 35 except for the above conditions, the description of the same respects is omitted here.

Example 59

Example 59 is a case of using a vapor-deposited metal film as the mirror layer 5 and an acrylic plate as the substrate 3. The vapor-deposited metal film used is obtained by vapor-depositing aluminum with a purity of 99.9% on a 100-µm-thick PET film with a vacuum evaporator such that the film thickness is 100 nm. The thickness (tM) of the vapor-deposited metal film is 100 µm (the film thickness of aluminum is not considered because it is relatively small), and the reflectance thereof is 85%. The adhesive layer 4 is attached to the PET-film-side surface of the vapor-deposited metal film. The Ra of the adhesive layer 4-side surface of the acrylic plate is 0.014 µm. Since the mirror plate of Example 59 is the same as the mirror plate of Example 35 except for the above conditions, the description of the same respects is omitted here.

Comparative Embodiment 2

Comparative Embodiment 2 is a case where at least one of the Ra of the adhesive layer 4-side surface of the substrate 3, to/tM, and tH/tM falls within a different range from that in Embodiment 2. Since the mirror plate of Comparative Embodiment 2 is the same as the mirror plate of Embodiment 2 except for the above conditions, the description of the same respects is omitted here.

The following are comparative examples relating to the mirror plate of Comparative Embodiment 2.

Comparative Example 22

Comparative Example 22 is a case where the doubling number for forming the reflective polarizing layer is three and the thickness (tM) of the reflective polarizing layer is 17 µm. Since the mirror plate of Comparative Example 22 is the same as the mirror plate of Example 23 except for the above conditions, the description of the same respects is omitted here.

Comparative Example 23

Comparative Example 23 is a case where the doubling number for forming the reflective polarizing layer is four and the thickness (tM) of the reflective polarizing layer is 23 µm. Since the mirror plate of Comparative Example 23 is the same as the mirror plate of Example 23 except for the above conditions, the description of the same respects is omitted here.

Comparative Example 24

Comparative Example 24 is a case where the doubling number for forming the reflective polarizing layer is five and the thickness (tM) of the reflective polarizing layer is 29 µm. Since the mirror plate of Comparative Example 24 is the same as the mirror plate of Example 23 except for the above conditions, the description of the same respects is omitted here.

Comparative Example 25

Comparative Example 25 is a case where the doubling number for forming the reflective polarizing layer is three and the thickness (tM) of the reflective polarizing layer is 17 µm. Since the mirror plate of Comparative Example 25 is the same as the mirror plate of Example 32 except for the above conditions, the description of the same respects is omitted here.

Comparative Example 26

Comparative Example 26 is a case where the doubling number for forming the reflective polarizing layer is four and the thickness (tM) of the reflective polarizing layer is 23 µm. Since the mirror plate of Comparative Example 26 is the same as the mirror plate of Example 32 except for the above conditions, the description of the same respects is omitted here.

Comparative Example 27

Comparative Example 27 is a case where the doubling number for forming the reflective polarizing layer is five and the thickness (tM) of the reflective polarizing layer is 29 µm. Since the mirror plate of Comparative Example 27 is the same as the mirror plate of Example 32 except for the above conditions, the description of the same respects is omitted here.

Comparative Example 28

Comparative Example 28 is a case where the doubling number for forming the reflective polarizing layer is six and the thickness (tM) of the reflective polarizing layer is 35 µm. Since the mirror plate of Comparative Example 28 is the same as the mirror plate of Example 32 except for the above conditions, the description of the same respects is omitted here.

Comparative Example 29

Comparative Example 29 is a case where the doubling number for forming the reflective polarizing layer is eight and the thickness (tM) of the reflective polarizing layer is 46 µm. Since the mirror plate of Comparative Example 29 is the same as the mirror plate of Example 32 except for the above conditions, the description of the same respects is omitted here.

Comparative Example 30

Comparative Example 30 is a case where the doubling number for forming the reflective polarizing layer is 10 and the thickness (tM) of the reflective polarizing layer is 58 µm. Since the mirror plate of Comparative Example 30 is the same as the mirror plate of Example 32 except for the above conditions, the description of the same respects is omitted here.

Comparative Example 31

Comparative Example 31 is a case where the doubling number for forming the reflective polarizing layer is three and the thickness (tM) of the reflective polarizing layer is 17 µm. Since the mirror plate of Comparative Example 31 is the same as the mirror plate of Example 38 except for the above conditions, the description of the same respects is omitted here.

Comparative Example 32

Comparative Example 32 is a case where the doubling number for forming the reflective polarizing layer is four and the thickness (tM) of the reflective polarizing layer is 23 µm. Since the mirror plate of Comparative Example 32 is the same as the mirror plate of Example 38 except for the above conditions, the description of the same respects is omitted here.

Comparative Example 33

Comparative Example 33 is a case where the doubling number for forming the reflective polarizing layer is five and the thickness (tM) of the reflective polarizing layer is 29 µm. Since the mirror plate of Comparative Example 33 is the same as the mirror plate of Example 38 except for the above conditions, the description of the same respects is omitted here.

Comparative Example 34

Comparative Example 34 is a case where the doubling number for forming the reflective polarizing layer is six and the thickness (tM) of the reflective polarizing layer is 35 µm. Since the mirror plate of Comparative Example 34 is the same as the mirror plate of Example 38 except for the above conditions, the description of the same respects is omitted here.

Comparative Example 35

Comparative Example 35 is a case where the doubling number for forming the reflective polarizing layer is eight and the thickness (tM) of the reflective polarizing layer is 46 µm. Since the mirror plate of Comparative Example 35 is the same as the mirror plate of Example 38 except for the above conditions, the description of the same respects is omitted here.

Comparative Example 36

Comparative Example 36 is a case where the doubling number for forming the reflective polarizing layer is 10 and the thickness (tM) of the reflective polarizing layer is 58 µm. Since the mirror plate of Comparative Example 36 is the same as the mirror plate of Example 38 except for the above conditions, the description of the same respects is omitted here.

Comparative Example 37

Comparative Example 37 is a case where the doubling number for forming the reflective polarizing layer is 12 and the thickness (tM) of the reflective polarizing layer is 70 µm. Since the mirror plate of Comparative Example 37 is the same as the mirror plate of Example 38 except for the above conditions, the description of the same respects is omitted here.

Comparative Example 38

Comparative Example 38 is a case where the doubling number for forming the reflective polarizing layer is 14 and the thickness (tM) of the reflective polarizing layer is 81 µm. Since the mirror plate of Comparative Example 38 is the same as the mirror plate of Example 38 except for the above conditions, the description of the same respects is omitted here.

Comparative Example 39

Comparative Example 39 is a case where the doubling number for forming the reflective polarizing layer is 16 and the thickness (tM) of the reflective polarizing layer is 93 µm. Since the mirror plate of Comparative Example 39 is the same as the mirror plate of Example 38 except for the above conditions, the description of the same respects is omitted here.

Comparative Example 40

Comparative Example 40 is a case where the doubling number for forming the reflective polarizing layer is 18 and the thickness (tM) of the reflective polarizing layer is 104 µm. Since the mirror plate of Comparative Example 40 is the same as the mirror plate of Example 38 except for the above conditions, the description of the same respects is omitted here.

Comparative Example 41

Comparative Example 41 is a case where the doubling number for forming the reflective polarizing layer is 20 and the thickness (tM) of the reflective polarizing layer is 116 µm. Since the mirror plate of Comparative Example 41 is the same as the mirror plate of Example 38 except for the above conditions, the description of the same respects is omitted here.

Comparative Example 42

Comparative Example 42 is a case where the doubling number for forming the reflective polarizing layer is three and the thickness (tM) of the reflective polarizing layer is 17 µm. Since the mirror plate of Comparative Example 42 is the same as the mirror plate of Example 39 except for the above conditions, the description of the same respects is omitted here.

Comparative Example 43

Comparative Example 43 is a case where the doubling number for forming the reflective polarizing layer is four and the thickness (tM) of the reflective polarizing layer is 23 μm. Since the mirror plate of Comparative Example 43 is the same as the mirror plate of Example 39 except for the above conditions, the description of the same respects is omitted here.

Comparative Example 44

Comparative Example 44 is a case where the doubling number for forming the reflective polarizing layer is five and the thickness (tM) of the reflective polarizing layer is 29 μm. Since the mirror plate of Comparative Example 44 is the same as the mirror plate of Example 39 except for the above conditions, the description of the same respects is omitted here.

Comparative Example 45

Comparative Example 45 is a case where the doubling number for forming the reflective polarizing layer is six and the thickness (tM) of the reflective polarizing layer is 35 μm. Since the mirror plate of Comparative Example 45 is the same as the mirror plate of Example 39 except for the above conditions, the description of the same respects is omitted here.

Comparative Example 46

Comparative Example 46 is a case where the doubling number for forming the reflective polarizing layer is eight and the thickness (tM) of the reflective polarizing layer is 46 μm. Since the mirror plate of Comparative Example 46 is the same as the mirror plate of Example 39 except for the above conditions, the description of the same respects is omitted here.

Comparative Example 47

Comparative Example 47 is a case where the doubling number for forming the reflective polarizing layer is three and the thickness (tM) of the reflective polarizing layer is 17 μm. Since the mirror plate of Comparative Example 47 is the same as the mirror plate of Example 46 except for the above conditions, the description of the same respects is omitted here.

Comparative Example 48

Comparative Example 48 is a case where the doubling number for forming the reflective polarizing layer is four and the thickness (tM) of the reflective polarizing layer is 23 μm. Since the mirror plate of Comparative Example 48 is the same as the mirror plate of Example 46 except for the above conditions, the description of the same respects is omitted here.

Comparative Example 49

Comparative Example 49 is a case where the doubling number for forming the reflective polarizing layer is five and the thickness (tM) of the reflective polarizing layer is 29 μm. Since the mirror plate of Comparative Example 49 is the same as the mirror plate of Example 46 except for the above conditions, the description of the same respects is omitted here.

Comparative Example 50

Comparative Example 50 is a case where the doubling number for forming the reflective polarizing layer is six and the thickness (tM) of the reflective polarizing layer is 35 μm. Since the mirror plate of Comparative Example 50 is the same as the mirror plate of Example 46 except for the above conditions, the description of the same respects is omitted here.

Comparative Example 51

Comparative Example 51 is a case where the doubling number for forming the reflective polarizing layer is eight and the thickness (tM) of the reflective polarizing layer is 46 μm. Since the mirror plate of Comparative Example 51 is the same as the mirror plate of Example 46 except for the above conditions, the description of the same respects is omitted here.

Comparative Example 52

Comparative Example 52 is a case where the doubling number for forming the reflective polarizing layer is 10 and the thickness (tM) of the reflective polarizing layer is 58 μm. Since the mirror plate of Comparative Example 52 is the same as the mirror plate of Example 46 except for the above conditions, the description of the same respects is omitted here.

Comparative Example 53

Comparative Example 53 is a case where the doubling number for forming the reflective polarizing layer is three and the thickness (tM) of the reflective polarizing layer is 17 μm. Since the mirror plate of Comparative Example 53 is the same as the mirror plate of Example 52 except for the above conditions, the description of the same respects is omitted here.

Comparative Example 54

Comparative Example 54 is a case where the doubling number for forming the reflective polarizing layer is four and the thickness (tM) of the reflective polarizing layer is 23 μm. Since the mirror plate of Comparative Example 54 is the same as the mirror plate of Example 52 except for the above conditions, the description of the same respects is omitted here.

Comparative Example 55

Comparative Example 55 is a case where the doubling number for forming the reflective polarizing layer is five and the thickness (tM) of the reflective polarizing layer is 29 μm. Since the mirror plate of Comparative Example 55 is the same as the mirror plate of Example 52 except for the above conditions, the description of the same respects is omitted here.

Comparative Example 56

Comparative Example 56 is a case where the doubling number for forming the reflective polarizing layer is six and the thickness (tM) of the reflective polarizing layer is 35 μm. Since the mirror plate of Comparative Example 56 is the same as the mirror plate of Example 52 except for the above conditions, the description of the same respects is omitted here.

Comparative Example 57

Comparative Example 57 is a case where the doubling number for forming the reflective polarizing layer is eight and the thickness (tM) of the reflective polarizing layer is 46 µm. Since the mirror plate of Comparative Example 57 is the same as the mirror plate of Example 52 except for the above conditions, the description of the same respects is omitted here.

Comparative Example 58

Comparative Example 58 is a case where the doubling number for forming the reflective polarizing layer is 10 and the thickness (tM) of the reflective polarizing layer is 58 µm. Since the mirror plate of Comparative Example 58 is the same as the mirror plate of Example 52 except for the above conditions, the description of the same respects is omitted here.

Comparative Example 59

Comparative Example 59 is a case where the doubling number for forming the reflective polarizing layer is 12 and the thickness (tM) of the reflective polarizing layer is 70 µm. Since the mirror plate of Comparative Example 59 is the same as the mirror plate of Example 52 except for the above conditions, the description of the same respects is omitted here.

Comparative Example 60

Comparative Example 60 is a case where the doubling number for forming the reflective polarizing layer is 14 and the thickness (tM) of the reflective polarizing layer is 81 µm. Since the mirror plate of Comparative Example 60 is the same as the mirror plate of Example 52 except for the above conditions, the description of the same respects is omitted here.

Comparative Example 61

Comparative Example 61 is a case where the doubling number for forming the reflective polarizing layer is 16 and the thickness (tM) of the reflective polarizing layer is 93 µm. Since the mirror plate of Comparative Example 61 is the same as the mirror plate of Example 52 except for the above conditions, the description of the same respects is omitted here.

Comparative Example 62

Comparative Example 62 is a case where the doubling number for forming the reflective polarizing layer is 18 and the thickness (tM) of the reflective polarizing layer is 104 µm. Since the mirror plate of Comparative Example 62 is the same as the mirror plate of Example 52 except for the above conditions, the description of the same respects is omitted here.

Comparative Example 63

Comparative Example 63 is a case where the doubling number for forming the reflective polarizing layer is 20 and the thickness (tM) of the reflective polarizing layer is 116 µm. Since the mirror plate of Comparative Example 63 is the same as the mirror plate of Example 52 except for the above conditions, the description of the same respects is omitted here.

Comparative Example 64

Comparative Example 64 is a case of using a polarizer that has underwent an anti-glare (AG) treatment with a haze (diffusivity) of 37% as the substrate 3. The adhesive layer 4 is attached to the surface having underwent the AG treatment of the polarizer, and the Ra of the surface is 0.162 µm. Since the mirror plate of Comparative Example 64 is the same as the mirror plate of Example 35 except for the above conditions, the description of the same respects is omitted here.

Comparative Example 65

Comparative Example 65 is a case of using ground glass having a haze of 62% as the substrate 3. The Ra of the adhesive layer 4-side surface of the ground glass is 0.331 µm. Since the mirror plate of Comparative Example 65 is the same as the mirror plate of Example 35 except for the above conditions, the description of the same respects is omitted here.

[Evaluation Result: Mirror Image Appearance]

Tables 3 and 4 show the thickness of the mirror layer 5: tM, the thickness of the adhesive layer 4: tA, the thickness of the hard coat layer 6: tH, tA/tM, tH/tM, the Ra of the adhesive layer 4-side surface of the substrate 3, and the evaluation result for the mirror image appearance, of each of the mirror plates of Examples 23 to 59 and Comparative Examples 22 to 65.

The evaluation method is as follows. Viewers (12 non-specialists) view a mirror image of a fluorescent tube reflected on the mirror plate of each example and evaluate if they see orange peel-like unevenness. The evaluation criteria are as follows. A: no orange peel-like unevenness is observed; B: almost no orange peel-like unevenness is observed; C: some orange peel-like unevenness is observed without uncomfortable feeling; and D: orange peel-like unevenness is observed with uncomfortable feeling. Here, the result evaluated as A, B, or C is considered to achieve the effects of the present invention. The values for tA/tM and tH/tM described in the table are rounded off to three decimal places.

TABLE 3

|  | tM (µm) | tA (µm) | tH (µm) | tA/tM | tH/tM | Ra (µm) | Evaluation result |
| --- | --- | --- | --- | --- | --- | --- | --- |
| Comparative Example 22 | 17 | 5 | 4 | 0.294 | 0.235 | 0.0005 | D |
| Comparative Example 23 | 23 | 5 | 4 | 0.217 | 0.174 | 0.0005 | D |
| Comparative Example 24 | 29 | 5 | 4 | 0.172 | 0.138 | 0.0005 | D |
| Example 23 | 35 | 5 | 4 | 0.143 | 0.114 | 0.0005 | B |
| Example 24 | 46 | 5 | 4 | 0.109 | 0.087 | 0.0005 | A |
| Example 25 | 58 | 5 | 4 | 0.086 | 0.069 | 0.0005 | A |
| Example 26 | 70 | 5 | 4 | 0.071 | 0.057 | 0.0005 | A |
| Example 27 | 81 | 5 | 4 | 0.062 | 0.049 | 0.0005 | A |

TABLE 3-continued

|  | tM (μm) | tA (μm) | tH (μm) | tA/tM | tH/tM | Ra (μm) | Evaluation result |
|---|---|---|---|---|---|---|---|
| Example 28 | 93 | 5 | 4 | 0.054 | 0.043 | 0.0005 | A |
| Example 29 | 104 | 5 | 4 | 0.048 | 0.038 | 0.0005 | A |
| Example 30 | 116 | 5 | 4 | 0.043 | 0.034 | 0.0005 | A |
| Example 31 | 151 | 5 | 4 | 0.033 | 0.026 | 0.0005 | A |
| Comparative Example 25 | 17 | 12 | 4 | 0.706 | 0.235 | 0.0005 | D |
| Comparative Example 26 | 23 | 12 | 4 | 0.522 | 0.174 | 0.0005 | D |
| Comparative Example 27 | 29 | 12 | 4 | 0.414 | 0.138 | 0.0005 | D |
| Comparative Example 28 | 35 | 12 | 4 | 0.343 | 0.114 | 0.0005 | D |
| Comparative Example 29 | 46 | 12 | 4 | 0.261 | 0.087 | 0.0005 | D |
| Comparative Example 30 | 58 | 12 | 4 | 0.207 | 0.069 | 0.0005 | D |
| Example 32 | 70 | 12 | 4 | 0.171 | 0.057 | 0.0005 | C |
| Example 33 | 81 | 12 | 4 | 0.148 | 0.049 | 0.0005 | B |
| Example 34 | 93 | 12 | 4 | 0.129 | 0.043 | 0.0005 | A |
| Example 35 | 104 | 12 | 4 | 0.115 | 0.038 | 0.0005 | A |
| Example 36 | 116 | 12 | 4 | 0.103 | 0.034 | 0.0005 | A |
| Example 37 | 151 | 12 | 4 | 0.079 | 0.026 | 0.0005 | A |
| Comparative Example 31 | 17 | 25 | 4 | 1.471 | 0.235 | 0.0005 | D |
| Comparative Example 32 | 23 | 25 | 4 | 1.087 | 0.174 | 0.0005 | D |
| Comparative Example 33 | 29 | 25 | 4 | 0.862 | 0.138 | 0.0005 | D |
| Comparative Example 34 | 35 | 25 | 4 | 0.714 | 0.114 | 0.0005 | D |
| Comparative Example 35 | 46 | 25 | 4 | 0.543 | 0.087 | 0.0005 | D |
| Comparative Example 36 | 58 | 25 | 4 | 0.431 | 0.069 | 0.0005 | D |
| Comparative Example 37 | 70 | 25 | 4 | 0.357 | 0.057 | 0.0005 | D |
| Comparative Example 38 | 81 | 25 | 4 | 0.309 | 0.049 | 0.0005 | D |
| Comparative Example 39 | 93 | 25 | 4 | 0.269 | 0.043 | 0.0005 | D |
| Comparative Example 40 | 104 | 25 | 4 | 0.240 | 0.038 | 0.0005 | D |
| Comparative Example 41 | 116 | 25 | 4 | 0.216 | 0.034 | 0.0005 | D |
| Example 38 | 151 | 25 | 4 | 0.166 | 0.026 | 0.0005 | C |

TABLE 4

|  | tM (μm) | tA (μm) | tH (μm) | tA/tM | tH/tM | Ra (μm) | Evaluation result |
|---|---|---|---|---|---|---|---|
| Comparative Example 42 | 17 | 5 | 7 | 0.294 | 0.412 | 0.0005 | D |
| Comparative Example 43 | 23 | 5 | 7 | 0.217 | 0.304 | 0.0005 | D |
| Comparative Example 44 | 29 | 5 | 7 | 0.172 | 0.241 | 0.0005 | D |
| Comparative Example 45 | 35 | 5 | 7 | 0.143 | 0.200 | 0.0005 | D |
| Comparative Example 46 | 46 | 5 | 7 | 0.109 | 0.152 | 0.0005 | D |
| Example 39 | 58 | 5 | 7 | 0.086 | 0.121 | 0.0005 | C |
| Example 40 | 70 | 5 | 7 | 0.071 | 0.100 | 0.0005 | A |
| Example 41 | 81 | 5 | 7 | 0.062 | 0.086 | 0.0005 | A |
| Example 42 | 93 | 5 | 7 | 0.054 | 0.075 | 0.0005 | A |
| Example 43 | 104 | 5 | 7 | 0.048 | 0.067 | 0.0005 | A |
| Example 44 | 116 | 5 | 7 | 0.043 | 0.060 | 0.0005 | A |
| Example 45 | 151 | 5 | 7 | 0.033 | 0.046 | 0.0005 | A |
| Comparative Example 47 | 17 | 12 | 7 | 0.706 | 0.412 | 0.0005 | D |
| Comparative Example 48 | 23 | 12 | 7 | 0.522 | 0.304 | 0.0005 | D |
| Comparative Example 49 | 29 | 12 | 7 | 0.414 | 0.241 | 0.0005 | D |
| Comparative Example 50 | 35 | 12 | 7 | 0.343 | 0.200 | 0.0005 | D |
| Comparative Example 51 | 46 | 12 | 7 | 0.261 | 0.152 | 0.0005 | D |
| Comparative Example 52 | 58 | 12 | 7 | 0.207 | 0.121 | 0.0005 | D |
| Example 46 | 70 | 12 | 7 | 0.171 | 0.100 | 0.0005 | C |
| Example 47 | 81 | 12 | 7 | 0.148 | 0.086 | 0.0005 | B |
| Example 48 | 93 | 12 | 7 | 0.129 | 0.075 | 0.0005 | A |
| Example 49 | 104 | 12 | 7 | 0.115 | 0.067 | 0.0005 | A |
| Example 50 | 116 | 12 | 7 | 0.103 | 0.060 | 0.0005 | A |
| Example 51 | 151 | 12 | 7 | 0.079 | 0.046 | 0.0005 | A |
| Comparative Example 53 | 17 | 25 | 7 | 1.471 | 0.412 | 0.0005 | D |
| Comparative Example 54 | 23 | 25 | 7 | 1.087 | 0.304 | 0.0005 | D |
| Comparative Example 55 | 29 | 25 | 7 | 0.862 | 0.241 | 0.0005 | D |
| Comparative Example 56 | 35 | 25 | 7 | 0.714 | 0.200 | 0.0005 | D |
| Comparative Example 57 | 46 | 25 | 7 | 0.543 | 0.152 | 0.0005 | D |
| Comparative Example 58 | 58 | 25 | 7 | 0.431 | 0.121 | 0.0005 | D |
| Comparative Example 59 | 70 | 25 | 7 | 0.357 | 0.100 | 0.0005 | D |
| Comparative Example 60 | 81 | 25 | 7 | 0.309 | 0.086 | 0.0005 | D |
| Comparative Example 61 | 93 | 25 | 7 | 0.269 | 0.075 | 0.0005 | D |
| Comparative Example 62 | 104 | 25 | 7 | 0.240 | 0.067 | 0.0005 | D |
| Comparative Example 63 | 116 | 25 | 7 | 0.216 | 0.060 | 0.0005 | D |
| Example 52 | 151 | 25 | 7 | 0.166 | 0.046 | 0.0005 | C |
| Example 53 | 104 | 12 | 4 | 0.115 | 0.038 | 0.014 | A |
| Example 54 | 104 | 12 | 4 | 0.115 | 0.038 | 0.024 | A |
| Comparative Example 64 | 104 | 12 | 4 | 0.115 | 0.038 | 0.162 | D |

TABLE 4-continued

|  | tM (μm) | tA (μm) | tH (μm) | tA/tM | tH/tM | Ra (μm) | Evaluation result |
|---|---|---|---|---|---|---|---|
| Comparative Example 65 | 104 | 12 | 4 | 0.115 | 0.038 | 0.331 | D |
| Example 55 | 100 | 12 | 4 | 0.115 | 0.040 | 0.0005 | A |
| Example 56 | 100 | 12 | 4 | 0.115 | 0.040 | 0.0005 | A |
| Example 57 | 100 | 12 | 4 | 0.115 | 0.040 | 0.0005 | A |
| Example 58 | 100 | 12 | 4 | 0.115 | 0.040 | 0.014 | A |
| Example 59 | 100 | 12 | 4 | 0.115 | 0.040 | 0.014 | A |

As shown in Tables 3 and 4, all of the mirror plates of Examples 23 to 59 are evaluated to have better mirror image appearance than the mirror plates of Comparative Examples 22 to 65. In particular, the mirror plates of Examples 24 to 31, 34 to 37, 40 to 45, 48 to 51, and 53 to 59 are evaluated that the mirror image has no orange peel-like unevenness and is thus of very high quality. In order to sufficiently suppress the occurrence of orange peel-like unevenness, tA/tM≤0.15 and tH/tM≤0.12 are preferred, and tA/tM≤0.14 and tH/tM≤0.10 are more preferred.

In contrast, the mirror plates of Comparative Examples 22 to 65 cause a mirror image with orange peel-like unevenness, giving very uncomfortable feeling. The table indicates that even if the Ra of the adhesive layer 4-side surface of the substrate 3 is the same as those of Examples 23 to 52 and 55 to 57 as in the mirror plates of Comparative Examples 22 to 63, a large value for at least one of tA/tM and tH/tM (tA/tM>0.18 and/or tH/tM>0.13) causes orange peel-like unevenness. The table also indicates that even if the values for tA/tM and tH/tM are the same as those of Examples 35, 53, and 54 as in the mirror plates of Comparative Examples 64 and 65, a large value for the Ra of the adhesive layer 4-side surface of the substrate 3 (Ra of 0.03 μm or more) causes orange peel-like unevenness.

[Evaluation Result: Image Clarity]

Table 5 shows the results for the image clarity of the mirror plates of Examples 35, 53, 54, and 55 to 59, and Comparative Examples 23, 24, 64, and 65, in addition to the items (excluding tA/tM and tH/tM) shown in Tables 3 and 4 for those mirror plates.

The image clarity is measured in conformity with ASTM-D5767-2004. The measuring device used is an image clarity measuring device (trade name: ICM-1) available from Suga Test Instruments Co., Ltd., and the reflectance measurement is performed at an angle of incidence of 45°. In Table 5, the image clarity G is calculated from the following formula (1) by measuring the maximum reflectance M1 and the minimum reflectance m1, the reflectances being measured by irradiating a 0.25-mm-width optical comb with transmitted light incident on the mirror plate of each example from the substrate 3-side surface, the formula (1) being:

$$\text{Image clarity } G(\%) = 100 \times (M1 - m1)/(M1 + m1) \qquad (1).$$

Meanwhile, the image clarity F is calculated from the following formula (2) by measuring the maximum reflectance M2 and the minimum reflectance m2, the reflectances being measured by irradiating a 0.25-mm-width optical comb with transmitted light incident on the mirror plate of each example from the mirror film 2a-side surface, the formula (2) being:

$$\text{Image clarity } F(\%) = 100 \times (M2 - m2)/(M2 + m2) \qquad (2).$$

TABLE 5

|  | tM (μm) | tA (μm) | tH (μm) | Ra (μm) | Image Clarity G (%) | Image Clarity F (%) | Evaluation result |
|---|---|---|---|---|---|---|---|
| Comparative Example 23 | 23 | 5 | 4 | 0.0005 | 33 | 26 | D |
| Comparative Example 24 | 29 | 5 | 4 | 0.0005 | 42 | 32 | D |
| Example 35 | 104 | 12 | 4 | 0.0005 | 79 | 69 | A |
| Example 53 | 104 | 12 | 4 | 0.014 | 77 | 67 | A |
| Example 54 | 104 | 12 | 4 | 0.024 | 71 | 62 | A |
| Comparative Example 64 | 104 | 12 | 4 | 0.162 | 29 | 24 | D |
| Comparative Example 65 | 104 | 12 | 4 | 0.331 | 26 | 23 | D |
| Example 55 | 100 | 12 | 4 | 0.0005 | 81 | 72 | A |
| Example 56 | 100 | 12 | 4 | 0.0005 | 81 | 71 | A |
| Example 57 | 100 | 12 | 4 | 0.0005 | 82 | 72 | A |
| Example 58 | 100 | 12 | 4 | 0.014 | 78 | 69 | A |
| Example 59 | 100 | 12 | 4 | 0.014 | 78 | 71 | A |

As shown in Table 5, all of the mirror plates of Examples 35, 53, 54, and 55 to 59 have higher image clarities G and F than the mirror plates of Comparative Examples 23, 24, 64, and 65. Consideration of the above along with the evaluation results for the mirror image appearance indicates that the image clarities G and F can be taken as indices relating to the mirror image appearance and are preferably 45% or higher, more preferably 60% or higher, still more preferably 80% or higher. In addition, the comparison of Examples 35, 53, and 54 with Comparative Examples 64 and 65, in which tM, tA, and tH are the same as each other and the Ra's of the adhesive layer 4-side surface of the substrate 3 are different from each other, indicates that the image clarities G and F increase as the Ra decreases. Accordingly, in order to achieve more enhanced image clarities G and F, the Ra of the adhesive layer 4-side surface of the substrate 3 is preferably 0.014 μm or less, more preferably 0.001 μm or less, still more preferably 0.0005 μm or less.

Other Preferred Examples

A mirror display including the second mirror plate of the present invention and a display device may be formed. For example, a mirror display including the mirror plate of Example 35 and a liquid crystal display device may be formed. In this case, the liquid crystal display device is disposed on the back surface side of the mirror plate to face the mirror film. Also, the mirror plate of Example 35 may be replaced by the mirror plate of one of Example 53 to 55 or the like. Furthermore, the liquid crystal display device may be replaced by, for example, a different display device such as a plasma display device, an organic electroluminescence display device, or an inorganic electroluminescence display device. Such a mirror display can function both as a mirror and as a display for displaying images and can suppress the occurrence of orange peel-like unevenness.

The mirror display including the mirror plate of Example 35 and a liquid crystal display device may also have a configuration in which the liquid crystal display device is disposed on the back surface side of the mirror plate to face the substrate. In this case, the mirror film is disposed on the viewing surface side of the mirror display. However, since the hard coat layer is disposed on the top surface of the viewing surface side of the mirror display, no practical problems are caused. In addition, a different mirror plate such as the mirror plate of Example 55 may replace the mirror plate of Example 35. Such a mirror display can suppress the occurrence of orange peel-like unevenness.

Also, a mirror display in which the polarizer as the substrate of the mirror plate of Example 54 is used as the polarizer on the viewing surface side of a liquid crystal display device may be formed. This configuration can eliminate one member from a configuration in which a liquid crystal display device is simply disposed on the back surface side of the mirror plate, and thus can achieve a mirror display improved in cost, thickness, weight, and the like.

The second mirror plate of the present invention can also replace a conventional mirror. For example, if a flat wall is employed as a substrate instead of the acrylic plate in the mirror plate of Example 58 or 59, attaching the mirror film to the wall can provide a film mirror which eliminates the concern for glass breakage, is inexpensive, has light weight, and may be enlarged.

ADDITIONAL REMARKS

The following are the examples of preferred modes of the mirror plate of the present invention. The respective examples may be appropriately employed in combination within the spirit of the present invention.

In the first mirror plate of the present invention, the thicknesses of the mirror layer and the adhesive layer may have a relation satisfying: $tA/tM \leq 0.15$. This can sufficiently suppress the occurrence of orange peel-like unevenness.

In the second mirror plate of the present invention, the thicknesses of the mirror layer, the adhesive layer, and the hard coat layer may have a relation satisfying: $tA/tM \leq 0.15$ and $tH/tM \leq 0.12$. This can sufficiently suppress the occurrence of orange peel-like unevenness.

The mirror plate may have an image clarity calculated from the following formula (1) of 45% or more, where M1 represents the maximum reflectance and m1 represents the minimum reflectance, the reflectances being measured by irradiating a 0.25-mm-width optical comb with transmitted light incident on the mirror plate from the substrate-side surface, the formula (1) being:

$$\text{Image clarity (\%)} = 100 \times (M1 - m1)/(M1 + m1) \qquad (1).$$

Also, the mirror plate may have an image clarity calculated from the following formula (2) of 45% or more, where M2 represents the maximum reflectance and m2 represents the minimum reflectance, the reflectances being measured by irradiating a 0.25-mm-width optical comb with transmitted light incident on the mirror plate from the mirror-film-side surface, the formula (2) being:

$$\text{Image clarity (\%)} = 100 \times (M2 - m2)/(M2 + m2) \qquad (2).$$

This enables the image clarities to be taken as indices relating to the mirror image appearance, providing a mirror plate capable of sufficiently suppressing the occurrence of orange peel-like unevenness.

The mirror layer may include a reflective polarizing layer. This configuration enables suitable use of the present invention even when a reflective polarizing layer is used as the mirror layer. Also, an arrangement in which multiple reflective polarizing layers as the mirror layer are stacked such that the respective transmission axes cross each other can sufficiently enhance the reflectance of the mirror layer.

The one surface of the substrate may have an arithmetic average roughness of 0.014 μm or less. This enables more enhanced image clarity to achieve better mirror image appearance.

The following are examples of the preferred modes of the mirror display of the present invention. The respective examples may be appropriately employed in combination within the spirit of the present invention.

The display device may be a liquid crystal display device. This enables suitable use of the present invention even when a liquid crystal display device is used as the display device. Furthermore, combination use with a reflective polarizing layer as the mirror layer can favorably achieve both of the visibility of the mirror image and the visibility of the image.

REFERENCE SIGNS LIST 1a, 1b: mirror plate
2a, 2b: mirror film
3: substrate
4: adhesive layer
5: mirror layer
6: hard coat layer

The invention claimed is:
1. A mirror plate comprising:
a mirror film including a mirror layer and an adhesive layer; and
a substrate,
the adhesive layer being attached to one surface of the substrate,
the one surface of the substrate having an arithmetic average roughness of 0.024 μm or less,
the mirror film including no hard coat layer containing cured resin,
a thickness of the mirror layer and a thickness of the adhesive layer having a relation satisfying: $tA/tM \leq 0.18$, where tM represents the thickness of the mirror layer and tA represents the thickness of the adhesive layer,
the mirror plate having an image clarity of 45% or more, where M1 represents a maximum reflectance and m1 represents a minimum reflectance, the maximum and minimum reflectances being measured by irradiating a 0.25-mm-width optical comb with transmitted light incident on the mirror plate from the substrate-side surface, the image clarity being calculated by:

$$\text{Image clarity (\%)} = 100 \times (M1 - m1)/(M1 + m1).$$

2. The mirror plate according to claim 1,
wherein the thicknesses of the mirror layer and the adhesive layer have a relation satisfying: tA/tM≤0.15.

3. The mirror plate according to claim 1,
wherein the mirror layer includes a reflective polarizing layer.

4. The mirror plate according to claim 1,
wherein the one surface of the substrate has an arithmetic average roughness of 0.014 μm or less.

5. A mirror display comprising:
the mirror plate according to claim 1; and
a display device,
the display device being disposed on the back surface side of the mirror plate.

6. The mirror display according to claim 5,
wherein the display device is a liquid crystal display device.

7. A mirror plate comprising:
a mirror film including a mirror layer, an adhesive layer, and a hard coat layer; and
a substrate,
the adhesive layer being disposed on one surface of the mirror layer and being attached to one surface of the substrate,
the hard coat layer being disposed on the other surface of the mirror layer and containing cured resin,
the one surface of the substrate having an arithmetic average roughness of 0.024 μm or less than 0.03 μm,
a thickness of the mirror layer, a thickness of the adhesive layer, and a thickness of the hard coat layer having a relation satisfying: tA/tM≤0.18 and tH/tM≤0.13, where tM represents the thickness of the mirror layer, tA represents the thickness of the adhesive layer, and tH represents the thickness of the hard coat layer,
the mirror plate having an image clarity of 45% or more, where M1 represents a maximum reflectance and m1 represents a minimum reflectance, the maximum and minimum reflectances being measured by irradiating a 0.25-mm-width optical comb with transmitted light incident on the mirror plate from the substrate-side surface, the image clarity being calculated by:

$$\text{Image clarity}=100\times(M1-m1)/(M1+m1).$$

8. The mirror plate according to claim 7,
wherein the thicknesses of the mirror layer, the adhesive layer, and the hard coat layer have a relation satisfying: tA/tM≤0.15 and tH/tM≤0.12.

9. The mirror plate according to claim 7,
wherein the mirror layer includes a reflective polarizing layer.

10. The mirror plate according to claim 7,
wherein the one surface of the substrate has an arithmetic average roughness of 0.014 μm or less.

11. A mirror display comprising:
the mirror plate according to claim 7; and
a display device,
the display device being disposed on the back surface side of the mirror plate.

12. The mirror display according to claim 11,
wherein the display device is a liquid crystal display device.

* * * * *

UNITED STATES PATENT AND TRADEMARK OFFICE
CERTIFICATE OF CORRECTION

PATENT NO. : 10,054,818 B2
APPLICATION NO. : 15/323143
DATED : August 21, 2018
INVENTOR(S) : Akira Sakai et al.

It is certified that error appears in the above-identified patent and that said Letters Patent is hereby corrected as shown below:

In the Claims

Claim 1 in Column 36, Lines 57 and 58, should be read as follows:
--... tA represents the thickness of the adhesive layer,--

Claim 7 in Column 37, Line 28, should be read as follows:
--average roughness of 0.024 μm or less,--

Claim 7 in Column 38, Lines 1 and 2, should be read as follows:
--... tA represents the thickness of the adhesive layer,...--

Claim 7 in Column 39, Line 11, should be read as follows:
--Image clarity (%) = 100 × (M1 - m1)/(M1 + m1).--

Signed and Sealed this
Twenty-third Day of October, 2018

Andrei Iancu
*Director of the United States Patent and Trademark Office*